United States Patent
Ranjan et al.

(10) Patent No.: US 12,408,232 B2
(45) Date of Patent: Sep. 2, 2025

(54) USER EQUIPMENT OPTIMIZATION FOR CONNECTED MODE DISCONTINUOUS RECEPTION TOGGLING

(71) Applicant: QUALCOMM Incorporated, San Diego, CA (US)

(72) Inventors: Sharda Ranjan, Hyderabad (IN); Naga Chandan Babu Gudivada, Hyderabad (IN); Kuo-Chun Lee, San Diego, CA (US); Subrahmanyam Vuddagiri, Hyderabad (IN); Tom Chin, San Diego, CA (US); Raghu Babu Movva, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 383 days.

(21) Appl. No.: 18/017,653

(22) PCT Filed: Sep. 10, 2021

(86) PCT No.: PCT/US2021/049949
§ 371 (c)(1),
(2) Date: Jan. 23, 2023

(87) PCT Pub. No.: WO2022/056314
PCT Pub. Date: Mar. 17, 2022

(65) Prior Publication Data
US 2023/0269821 A1    Aug. 24, 2023

(30) Foreign Application Priority Data
Sep. 10, 2020    (IN) .............................. 202041039155

(51) Int. Cl.
*H04W 76/28* (2018.01)

(52) U.S. Cl.
CPC ................................. *H04W 76/28* (2018.02)

(58) Field of Classification Search
CPC ....................................................... H04W 76/28
See application file for complete search history.

(56) References Cited

U.S. PATENT DOCUMENTS

| 8,804,546 B2 | 8/2014 | Tenny et al. |
| 9,743,459 B2 | 8/2017 | Shah et al. |
| (Continued) | | |

FOREIGN PATENT DOCUMENTS

| WO | WO-2009152367 | 12/2009 |
| WO | WO-2016019112 | 2/2016 |

OTHER PUBLICATIONS

International Search Report and Written Opinion—PCT/US2021/049949—ISA/EPO—Dec. 21, 2021.

*Primary Examiner* — Jamaal Henson
(74) *Attorney, Agent, or Firm* — QUALCOMM Incorporated

(57) ABSTRACT

Aspects presented herein may improve a UE's performance by optimizing the CDRX toggling at the UE. In one aspect, a UE transmits, to a base station, a first UE assistance information request, where the first UE assistance information request include s at least one of an updated CDRX cycle or an updated inactivity timer period, and the updated CDRX cycle is different from an initial CDRX cycle and/or the updated inactivity timer period is different from an initial inactivity timer period. The UE adjusts the initial CDRX cycle to the updated CDRX cycle based on the first UE assistance information request. The UE transmits, to the base station after the initial CDRX cycle is adjusted, a second UE assistance information request, where the second UE assistance information request includes at least one of the initial CDRX cycle or the initial inactivity timer period.

15 Claims, 14 Drawing Sheets

(56) References Cited

U.S. PATENT DOCUMENTS

| | | | |
|---|---|---|---|
| 2014/0247742 A1* | 9/2014 | Lee | H04W 24/10 |
| | | | 370/252 |
| 2015/0117286 A1* | 4/2015 | Kim | H04W 52/0216 |
| | | | 370/311 |
| 2016/0073284 A1 | 3/2016 | Qian et al. | |
| 2017/0019820 A1* | 1/2017 | Das | H04W 48/20 |
| 2017/0318536 A1 | 11/2017 | Manepalli et al. | |
| 2019/0037495 A1 | 1/2019 | John Wilson et al. | |
| 2019/0045577 A1* | 2/2019 | Kim | H04W 76/19 |
| 2019/0281652 A1 | 9/2019 | Zhang et al. | |
| 2023/0062804 A1* | 3/2023 | Selvanesan | H04W 76/14 |

\* cited by examiner

USER EQUIPMENT OPTIMIZATION FOR CONNECTED MODE DISCONTINUOUS RECEPTION TOGGLING

CROSS REFERENCE TO RELATED APPLICATION(S)

This application is a National Stage Application filed under 35 U.S.C. § 371 of PCT International Application Serial No. PCT/US2021/049949 entitled "USER EQUIPMENT OPTIMIZATION FOR CONNECTED MODE DISCONTINUOUS RECEPTION TOGGLING" and filed on Sep. 10, 2021, which claims the benefit of and priority to Indian Provisional Application No. 202041039155, entitled "USER EQUIPMENT OPTIMIZATION FOR CONNECTED MODE DISCONTINUOUS RECEPTION TOGGLING" and filed on Sep. 10, 2020, which are expressly incorporated by reference herein in their entirety.

TECHNICAL FIELD

The present disclosure relates generally to communication systems, and more particularly, to wireless communication involving connected mode discontinuous reception.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus may determine at least one of an updated connected mode discontinuous reception (CDRX) cycle or an updated inactivity timer period, where the updated CDRX cycle may be different from an initial CDRX cycle, and/or the updated inactivity timer period may be different from an initial inactivity timer period. The apparatus may also transmit, to a base station, a first UE assistance information request, the first UE assistance information request including at least one of the updated CDRX cycle or the updated inactivity timer period. The apparatus may also adjust the initial CDRX cycle to the updated CDRX cycle based on the first UE assistance information request. The apparatus may also transmit, to the base station after the initial CDRX cycle is adjusted, a second UE assistance information request, the second UE assistance information request including at least one of the initial CDRX cycle or the initial inactivity timer period.

In an aspect of the disclosure, a method, a computer-readable medium, and an apparatus are provided for wireless communication at a base station. The apparatus may receive, from a UE, a first UE assistance information request, where the first UE assistance information request may include at least one of an updated CDRX cycle or an updated inactivity timer period, the updated CDRX cycle may be different from an initial CDRX cycle at the UE, the updated inactivity timer period may be different from an initial inactivity timer period at the UE. The apparatus may also transmit a configuration to the UE to adjust the UE from the initial CDRX cycle to the updated CDRX cycle based on the first UE assistance information request. The apparatus may also receive, from the UE after the initial CDRX cycle is adjusted, a second UE assistance information request, the second UE assistance information request including at least one of the initial CDRX cycle or the initial inactivity timer period.

In an aspect of the disclosure, a method, a computer-readable medium, and an apparatus are provided for wireless communication at a UE. The apparatus may transmit, to a base station, a first UE assistance information request, the first UE assistance information request including at least one of an updated CDRX cycle or an updated inactivity timer period, the updated CDRX cycle being different from an initial CDRX cycle, the updated inactivity timer period being different from an initial inactivity timer period. The apparatus may also adjust the initial CDRX cycle to the updated CDRX cycle based on the first UE assistance information request. The apparatus may also transmit, to the base station after the initial CDRX cycle is adjusted, a second UE assistance information request, the second UE assistance information request including at least one of the initial CDRX cycle or the initial inactivity timer period.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
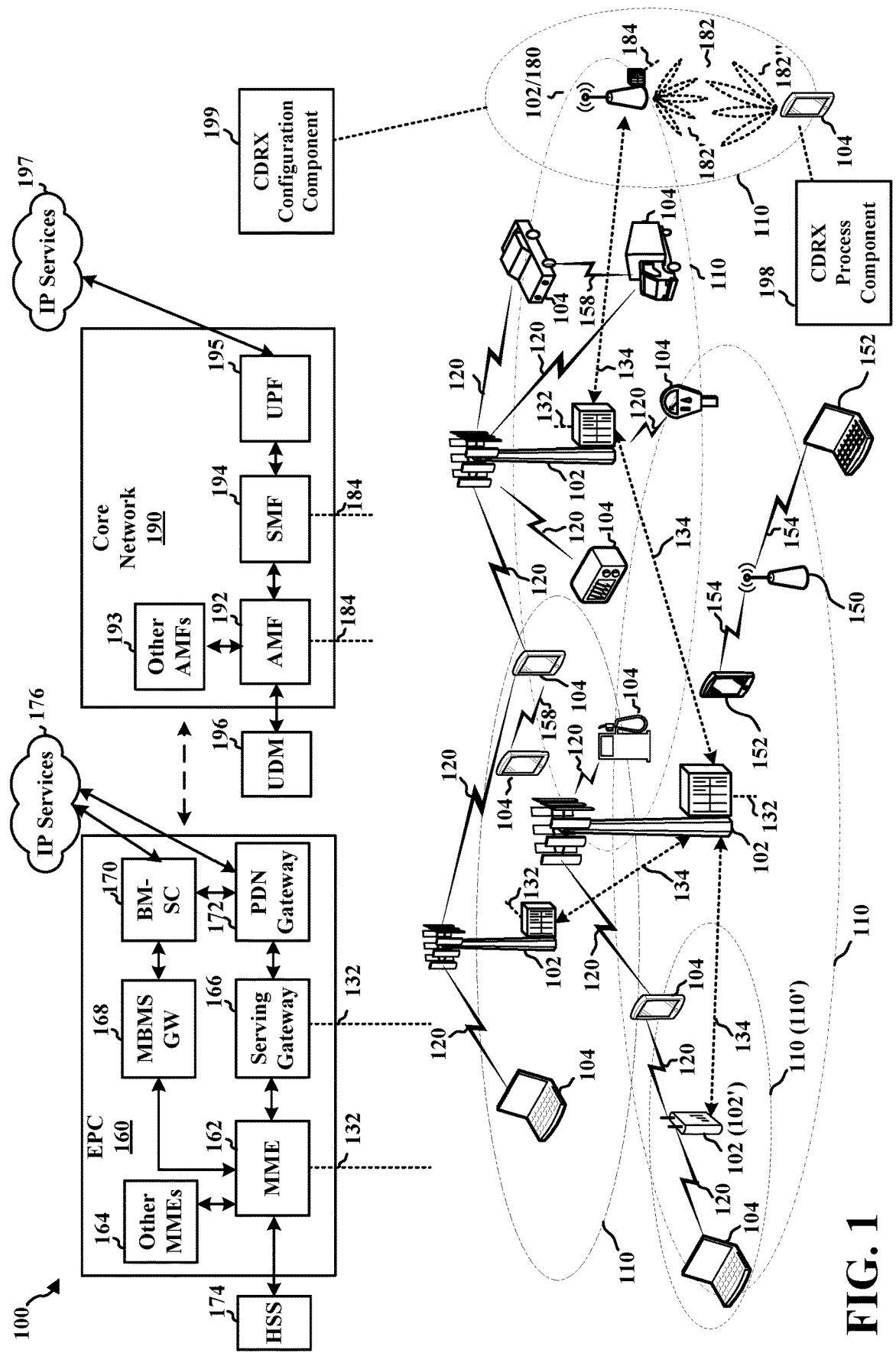
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregated, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronic s Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in a millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a CDRX process component 198 configured to determine at least one of an updated CDRX cycle or an updated inactivity timer period, the updated CDRX cycle being different from an initial CDRX cycle, the updated inactivity timer period being different from an initial inactivity timer period. The CDRX process component 198 may further be configured to transmit, to a base station, a first UE assistance information request, the first UE assistance information request including at least one of the updated CDRX cycle or the updated inactivity timer period. The CDRX process component 198 may further be configured to adjust the initial CDRX cycle to the updated CDRX cycle based on the first UE assistance information request. The CDRX process component 198 may further be configured to transmit, to the base station after the initial CDRX cycle is adjusted, a second UE assistance information request, the second UE assistance information request including at least one of the initial CDRX cycle or the initial inactivity timer period.

In certain aspects, the base station 102 or 180 may include a CDRX configuration component 199 configured to receive, from a UE, a first UE assistance information request, the first UE assistance information request including at least one of an updated CDRX cycle or an updated inactivity timer period, the updated CDRX cycle being different from an initial CDRX cycle at the UE, the updated inactivity timer period being different from an initial inactivity timer period at the UE. The CDRX configuration component 199 may further be configured to transmit a configuration to the UE to adjust the UE from the initial CDRX cycle to the updated CDRX cycle based on the first UE assistance information request. The CDRX configuration component 199 may further be configured to receive, from the UE after the initial CDRX cycle is adjusted, a second UE assistance information request, the second UE assistance information request including at least one of the initial CDRX cycle or the initial inactivity timer period.

Figure 2:
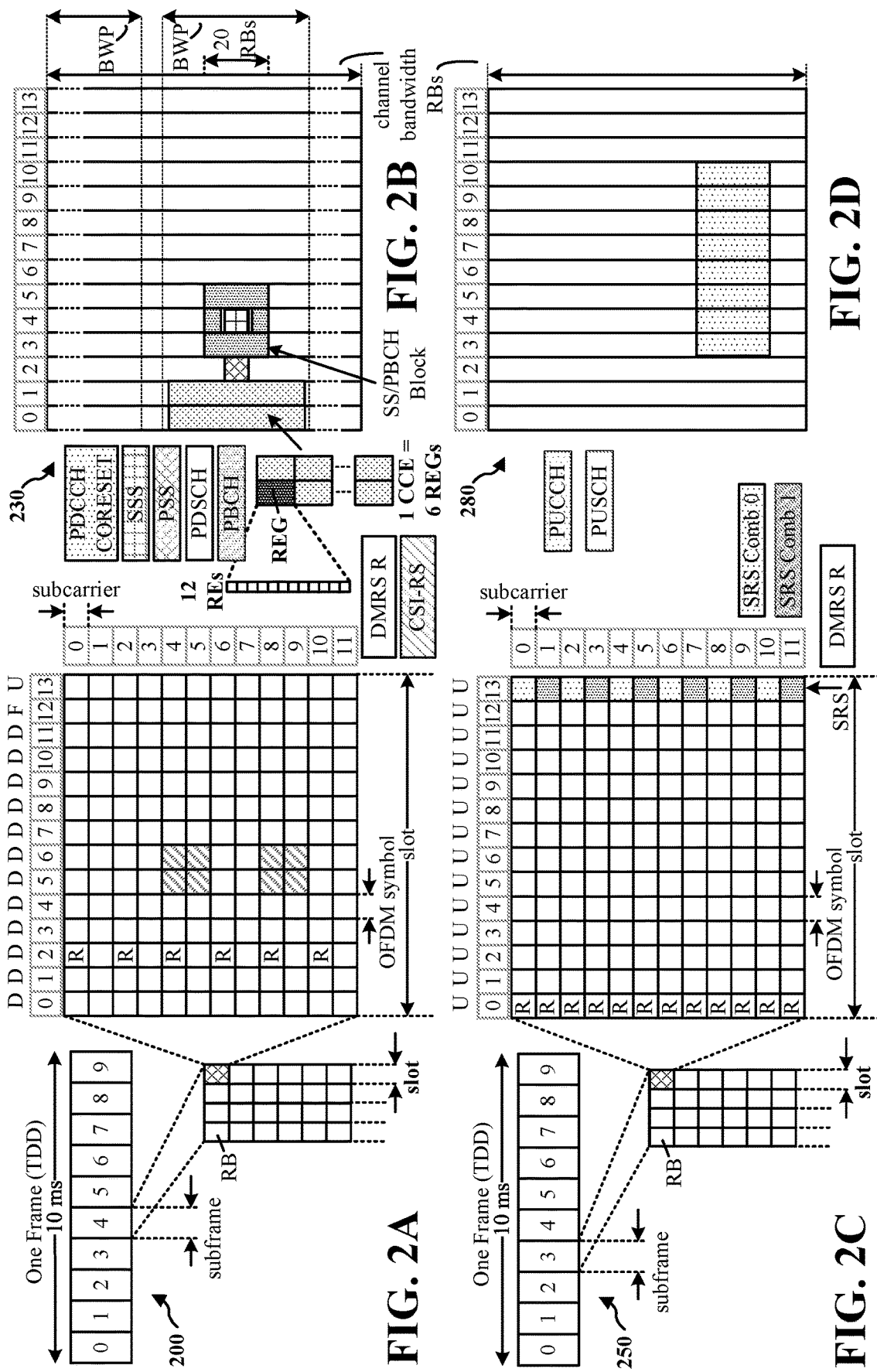
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SC S) and, effectively, the symbol length/duration, which is equal to 1/SCS.

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame.

The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
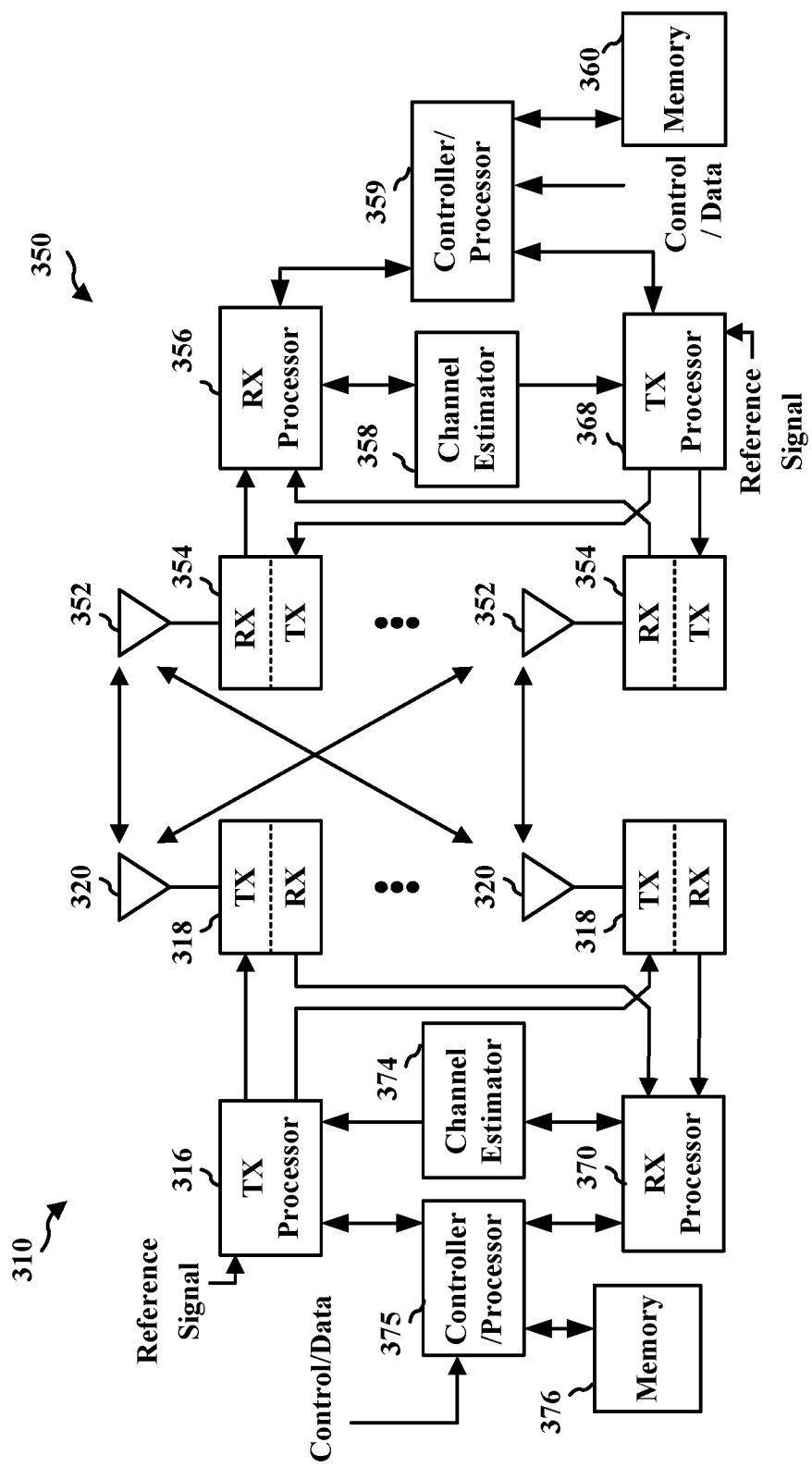
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the CDRX process component 198 of FIG. 1.

At least one of the TX processor 316, the RX processor 370, and the controller/processor 375 may be configured to perform aspects in connection with the CDRX configuration component 199 of FIG. 1.

A UE may reduce power consumption through discontinuous reception (DRX) in which the UE monitors for communication or transmits communication during a DRX ON duration and does not monitor for communication or transmit communication during a DRX OFF duration. The DRX OFF duration may correspond to a time during which the UE operates in a lower power mode, a sleep mode, etc. By having periods during which the UE does not monitor for or transmit communication, the UE may save power or extend battery life for the UE.

For example, referring back to FIG. 1, DRX may be used by a UE for communication over a link 120, e.g., a cellular link, access link, or UE-UTRAN (Uu) link, such as between a UE 104 and a base station 102 or 180, as illustrated in FIG. 1. The base station 102 or 180 may configure the UE 104 with a DRX configuration. The base station may configure DRX parameters for the UE that indicate the DRX cycle, and/or the DRX ON duration, etc. Additionally, the base station 102 or 180 may schedule the communication with the UE 104 based on the UE's DRX configuration because the base station is aware of the DRX configuration that the base station 102 or 180 provided to the UE 104.

Figure 4:
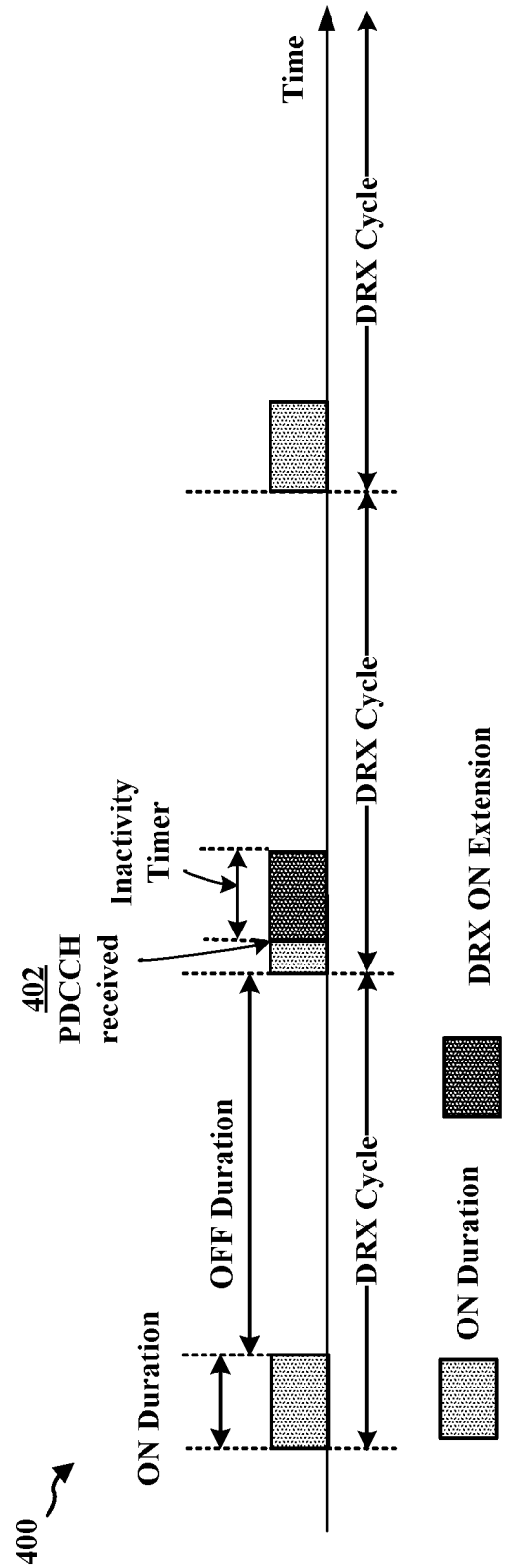
FIG. 4 illustrates an example of discontinuous reception (DRX) including an extension of a DRX ON duration in accordance with various aspects of the present disclosure.

FIG. 4 illustrates an example of DRX cycle 400 that may be configured by a base station 102 or 180 for a UE 104 using an access link 120 with the base station in accordance with various aspects of the present disclosure. The UE 104 may monitor for a PDCCH from the base station 102 or 180 during the DRX ON duration and may skip monitoring for the PDCCH during the DRX OFF duration. If the UE receives a PDCCH during the DRX ON duration, such as illustrated at 402, the UE may stay awake for an extended period of time based on an inactivity timer that starts upon the reception of the PDCCH. If the UE 104 does not receive downlink communication from the base station 102 or 180 during the duration of the inactivity timer, the UE may stop monitoring, e.g., enter into a sleep mode or a lower power mode, for the remaining DRX OFF duration.

There may be more than one type of the DRX operation. For example, there may be an idle mode DRX when the DRX is applied to a UE under an idle state, which may also be referred to as a paging cycle or a DRX paging cycle. Under the idle mode DRX, the DRX cycle may be the same as the paging cycle as the UE may be configured to receive paging messages. The UE may read the paging channel at certain subframes within specific radio frames. In another example, there may be an RRC mode DRX when the DRX is applied to a UE under an RRC connected state, which may also be referred to as a connected mode DRX (CDRX). Under the CDRX, when the UE is in the RRC connected state and there is no data transmission in the downlink or the uplink, the UE may transition into the CDRX mode and start monitoring for the PDCCH channel discontinuously, as described above. For the CDRX mode, there may further be a short CDRX cycle and a long CDRX cycle.

Figure 5:
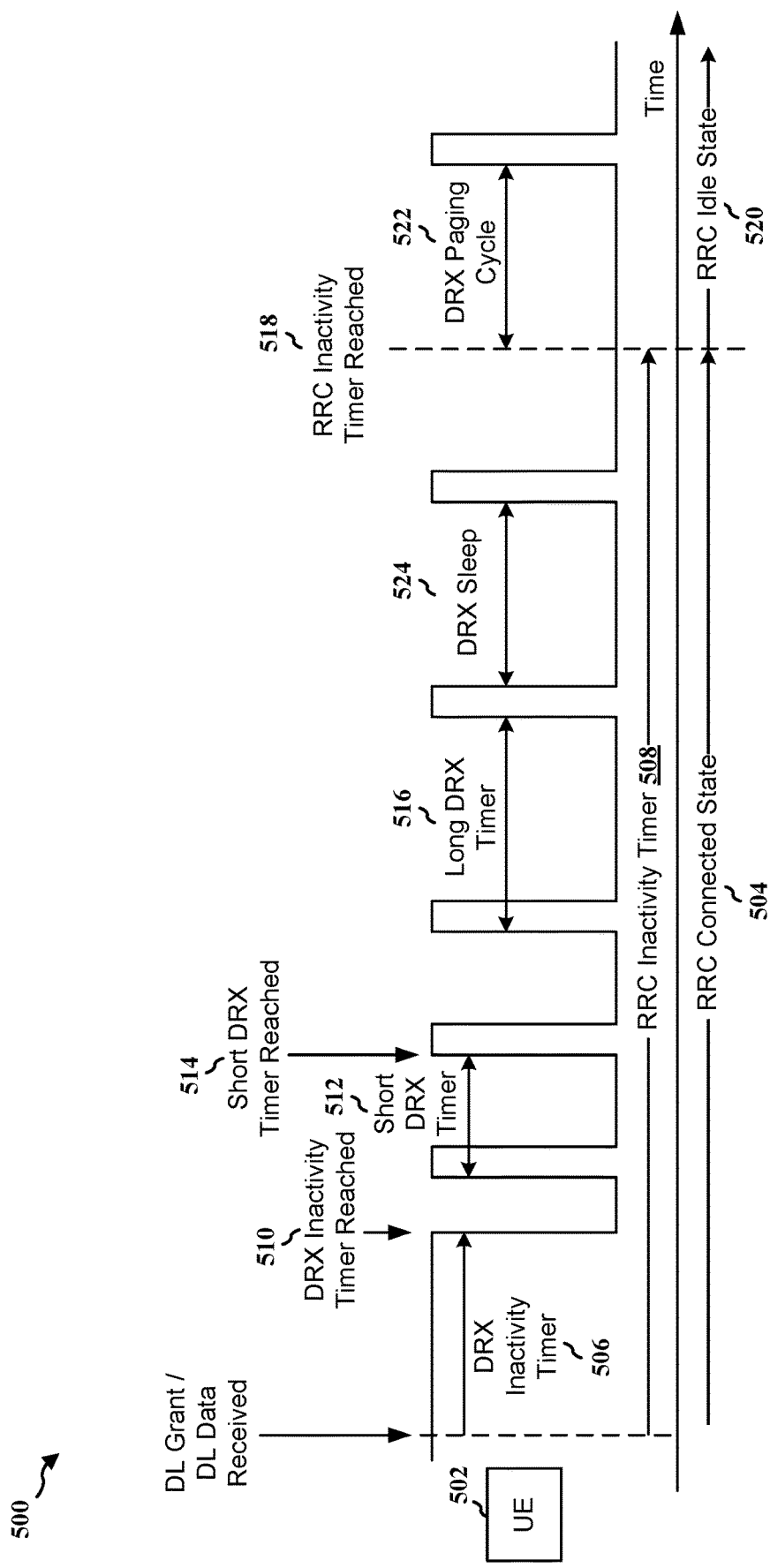
FIG. 5 is a diagram illustrating an example of different DRX types in accordance with various aspects of the present disclosure.

FIG. 5 is a diagram 500 illustrating examples of different types of DRX modes in accordance with various aspects of the present disclosure. When a UE 502 is in an RRC connected state 504, the UE 502 may monitor for a PDCCH transmitted from a serving base station. After the UE 502 receives a downlink grant and/or a downlink data (e.g., a scheduled transmission) from the serving base station, the UE 502 may activate/start a DRX inactivity timer 506 (e.g., a duration in which the DRX is not activated) and an RRC inactivity timer 508. While the DRX inactivity timer 506 is running, the UE 502 may monitor for the PDCCH continuously (e.g., in every subframe). If the UE 502 does not receive an additional downlink grant and/or uplink grant before the DRX inactivity timer 506 expires (e.g., at 510), the UE 502 may enter into a short DRX cycle and start a short DRX cycle timer 512. Then, the UE 502 may start monitoring for the PDCCH discontinuously. When the short DRX timer 512 expires (e.g., at 514), the UE 502 may end the short DRX cycle and enter into a long DRX cycle, and the UE 502 may also start a long DRX cycle timer 516. In some configurations, the UE 502 may be configured with the long DRX cycle without the short DRX cycle. In such configurations, the UE 502 may enter into the long DRX cycle after the DRX inactivity timer 506 expires. If there is no uplink and/or downlink activity (e.g., no PDCCH received) before the RRC inactivity timer 508 expires (e.g., at 518), the UE 502 may enter into an RRC idle state 520 after the RRC inactivity timer 508 expires. Under the RRC idle state 520, the UE 502 may use a DRX paging cycle 522 (e.g., the idle mode DRX) instead. In some configurations, the long DRX cycle may end before the RRC inactivity timer 508 expires, where the UE 502 may enter into a DRX sleep mode 524 (e.g., no DRX) in the interim.

A UE may perform a cell global identity (CGI) detection and a measurement for neighboring cell(s) (e.g., base station). The CGI may be a globally unique identifier for identifying a cell, which may be made up of a mobile country code (MCC), a mobile network code (MNC), a location area code (LAC) and a cell identification (cell ID). The combination of the MCC and the MNC may also be referred to as a public land mobile network (PLMN). The CGI may be used for automatic neighbor relation (ANR), self-organizing network (SON), etc. In detecting and/or measuring the CGI of a target cell, the UE may specify additional time to decode the MIB and/or the SIB of the target cell. Thus, the UE may specify a larger long CDRX cycle configured for the UE.

When a network (e.g., a serving base station) configures a UE with both long CDRX and short CDRX cycles, the UE may toggle between the long CDRX cycle and the short CDRX cycle based on DCI allocations (e.g., based on UE traffic activity). In some examples, for the short CDRX cycle, if the value of the short CDRX length is lower (e.g., has a shorter periodicity—the duration between each cycle is shorter), the UE may be configured or triggered to perform a frequency measurement more frequently (e.g., for measuring the signal from a cell, the channel condition, etc.). This may cause a high power consumption at the UE especially if the measurement involves measuring millimeter wave (mmW) frequencies. On the other hand, if the value of the short CDRX length is higher (e.g., has a longer periodicity—the duration between each cycle is longer), it may also not be optimal for the UE. For example, as the UE may be in a sleep mode for a longer period of time, it may cause delays in certain data transmission and/or processing (e.g., causing delays for NR addition in data activity cases). As the UE may be specified to follow the operating CDRX periodicities configured by the network, allowing both short and long CDRX cycles to be configured for the UE may cause toggling in cases of data activity, which may in turn increases UE's power consumption such as due to redundant mmW beamer switching (e.g., ON/OFF). For example, for a given duration, the UE may be performing the frequency measurement (e.g., for mmW frequencies) under the short CDRX cycle. During the short CDRX cycle, the network may configure the UE with a long CDRX cycle and indicates the UE to transition into the long CDRX cycle. As the UE may be performing the frequency measurement using mmW beam module(s)/antenna(s) when it receives the long CDRX configuration, the UE may be specified to turn off the mmW beam module(s)/antenna(s) before switching (e.g., toggling) to the long CDRX cycle, and then the UE may be specified to turn on the mmW beam module(s)/antenna(s) again after the switching. This may cause additional and high power consumption to the UE.

While it may not be optimal for a UE to toggle the CDRX frequently (e.g., between a long CDRX cycle and a short CDRX cycle), the toggling may still happen as it is under the network's control. In some examples, when the CDRX toggling is frequent, the UE may encounter performance issues, such as with measurement and/or search periodicities (e.g., causing higher power consumption), and with the user-experience (e.g., causing data processing delays—5G NR addition in the case of E-UTRAN new radio—dual connectivity mode, etc.). In other words, frequent toggling of the CDRX may occur between mmW radio frequency (RF) modules, which may cause the UE to end up with starting mmW modules/devices but not performing any further beam measurement. This may also prevent the UE from performing gapless frequency measurements as the toggling may stop mmW modules/devices in between gapless measurement objects. Also, if a short CDRX cycle is configured for the UE and the UE is performing intra-radio access technology (IRAT) measurements, the UE may make frequent mmW modules/devices ON/OFF switching or put the mmW modules/devices ON for a long time, which may cause additional power consumption at the UE. Thus, the UE's behavior may be optimized when the long CDRX is properly configured or determined. Also, if the network configures the UE with mmW frequency measurements (e.g., for (e.g., 5G NR) but there is no mmW frequency coverage, the UE may keep monitoring for the mmW frequencies. This may result in higher power consumption at the UE, and the UE may also miss one or more searches (e.g., cell search) due to the toggling. On the other hand, network (e.g., 5G NR) addition and/or performance (e.g., power consumption) may also be poor if a long CDRX cycle is configured for the UE due to the longer idle period.

Aspects presented herein may improve a UE's performance by optimizing the CDRX toggling at the UE. In one aspect, a UE may negotiate one or more CDRX parameters (e.g., duration for cycles and timers) with a network (e.g., a serving base station), where the UE may propose value(s) for one or more CDRX related parameters to the base station. If the proposed values are acceptable for the network, the network may configure the UE with the CDRX parameter(s) proposed by the UE.

Figure 6:
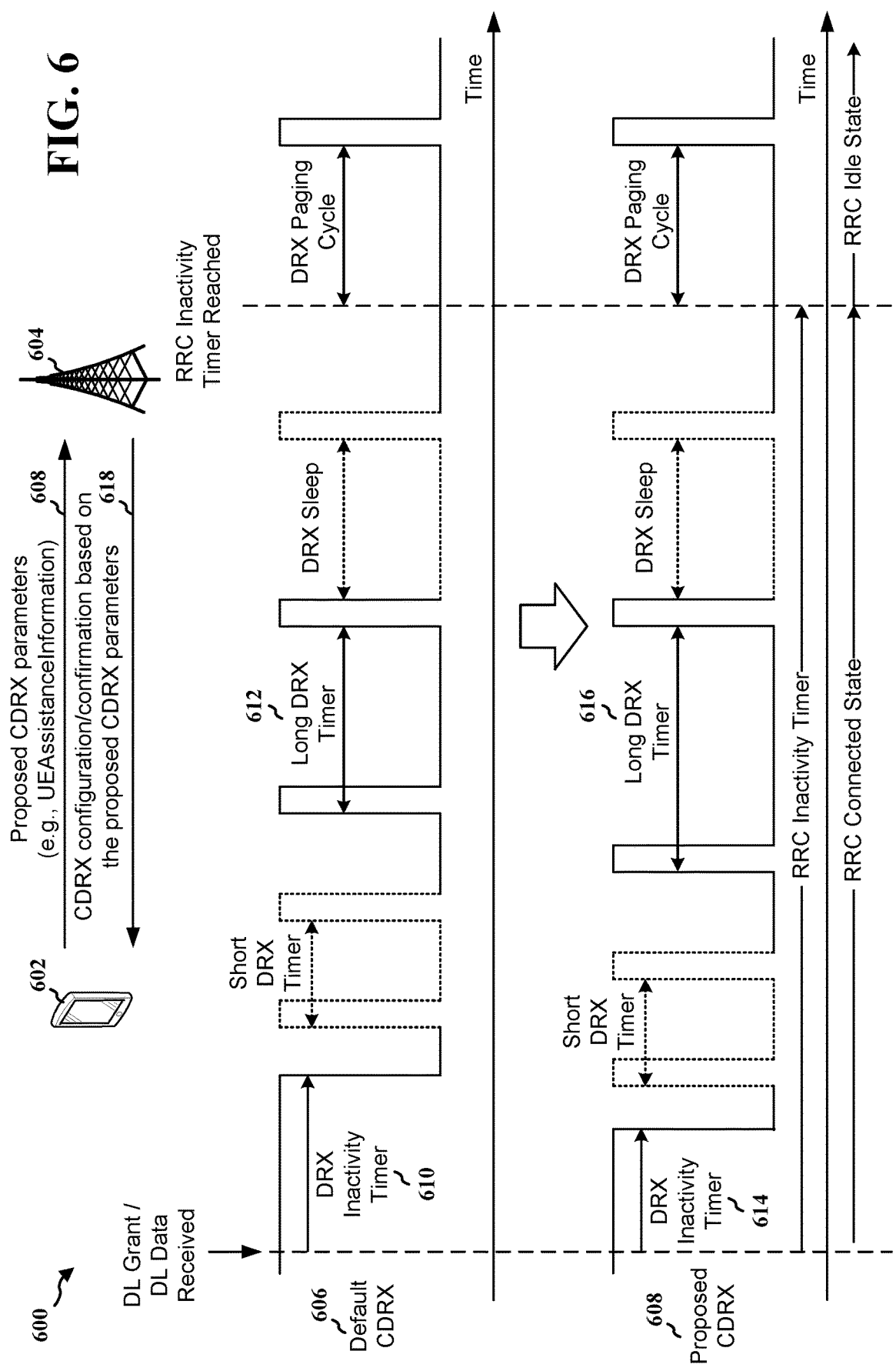
FIG. 6 is a diagram illustrating an example of negotiating DRX in accordance with various aspects of the present disclosure.

FIG. 6 is a diagram 600 illustrating an example of a UE 602 negotiating the CDRX parameter(s) with a base station 604 according to aspects of the present disclosure. The UE 602 may initially or by default be configured with a default CDRX 606 that includes a DRX inactivity timer 610 (e.g., corresponding to an inactive DRX duration) and a long DRX timer 612 (e.g., corresponding to a long CDRX cycle duration). In some scenarios, the default CDRX 606 may not be optimal for the UE 602's operation, such as when the UE 602 is performing or scheduled to perform one or more CGI measurements for one or more neighboring cells but the default CDRX 606 parameters (e.g., long DRX timer 612) are not sufficiently long enough to cover the measurements and/or the default CDRX 606 consumes too much UE power, etc. Thus, the UE 602 may determine to negotiate a different CDRX with the base station. For example, the UE 602 may indicate to the base station 604, such as through a UE assistance information message (e.g., UEAssistanceInformation), a proposed CDRX 608 with one or more CDRX related parameters being different from the default CDRX 606. The UE assistance information message may include a field for a DRX selection, where the UE may propose duration(s) for the DRX inactivity timer and/or the long DRX cycle within the DRX selection field. For example, the proposed CDRX 608 may have a different/adjusted (e.g., shorter) DRX inactivity timer 614 and/or a different/adjusted (e.g., longer) long CDRX timer 616. The proposed CDRX 608 may optionally include a proposed duration for the short DRX timer (e.g., corresponding to the short CDRX cycle duration) or to request the removal/suspension of the short DRX cycle if the UE 602 is also configured with a short DRX timer for the default CDRX 606.

In response, if the base station 604 determines that the proposed CDRX 608 may be performed by the UE 602, the base station 604 may send a CDRX configuration or a confirmation 618 to the UE 602 based on the proposed CDRX 608, where the UE 602 may be configured with the proposed CDRX 608 based on the CDRX configuration or the UE 602 may proceed with the proposed CDRX 606 after receiving the confirmation (e.g., a positive confirmation) from the base station 604 (e.g., if no configuration is involved). On the other hand, if the base station 604 determines that the proposed CDRX 608 may not be performed by the UE 602, the base station 604 may send a negative confirmation and/or the base station may not send a positive confirmation or a proposed CDRX configuration to the UE. If the UE 602 receives the negative confirmation or does not receive a positive confirmation from the base station 604, the UE may not proceed with the proposed CDRX 608.

In other words, a UE may negotiate the CDRX with a network by sending a request (e.g., through UEAssistanceInformation) to the network to request a different (e.g., longer) CDRX cycle and/or a different (e.g., shorter) inactivity timer to cover a sufficiently long CGI measurement when the UE is to perform a CGI measurement on one or more cells, which may specify a larger long CDRX cycle period. Thus, the UE may determine an optimal CDRX for its operation(s), such as based on pre-defined or configured rules. For example, the UE may determine the value(s) for the long CDRX lengths based at least in part on its power consumption, UE capabilities, and/or the measurement schedule duration, and then the UE may negotiate the value(s) with the base station (e.g., by sending UEAssistanceInformation). For example, referring back to FIG. 6, the UE 602 may be scheduled to perform five CGI measurements for five different cells, where the UE 602 may be able to perform two CGI measurements if the UE 602 uses the default CDRX 606. This may lead the UE 602 to switch its RF module(s) (e.g., mmW modules/devices) from ON to OFF after the two CGI measurements are performed, and the UE may restart the RF module(s) again (e.g., from OFF to ON) for the next two CGI measurements. This may cause additional power consumption at the UE 602. However, by having a shorter DRX inactivity duration and a longer long DRX cycle, the UE 602 may be able to perform all five CGI measurements within the proposed CDRX 608. Thus, there may be less switching for the RF modules (e.g., from ON to OFF and vice versa) at the UE, which may reduce the power consumption at the UE.

After the UE 602 completes the operation (e.g., the CGI measurement), the UE 602 may be configured to switch back to the default CDRX 606. In one example, the UE 602 may send another message (e.g., UEAssistanceInformation) to the base station 604 requesting the base station 604 for the default CDRX 606. In response, the base station 604 may send a CDRX configuration (e.g., for the default CDRX 606) or a confirmation 618 to the UE 602, where the UE 602 may be configured back to the default CDRX 606 based on the CDRX configuration or the UE 602 may proceed with the proposed default CDRX 606 after receiving the confirmation from the base station 604 (e.g., if no configuration is involved). In another example, the UE 602 may be configured to switch back to the default CDRX 606 after a pre-defined or a negotiated period (e.g., without sending another request to the base station 604) or after it completes an intended operation (e.g., a pre-defined number of CGI measurements).

In another example, for a network involving both 4G LTE and 5G NR, due to LTE and NR time misalignment, if a UE is unable to detect NR cell(s) in an LTE network-configured over the air (OTA) gap (e.g., a 6 ms duration), the UE may open a 21 ms extended OTA gap by suspending the uplink/downlink activity. Considering a faster secondary cell group (SCG) addition, this 21 ms gap may be periodically opened for cell measurements (e.g., L2NR measurement) until one or more cells are detected. This may have an adverse impact on LTE throughput performance when multiple NR neighbors are configured for the measurements. Thus, by enabling the UE to negotiate a long CDRX cycle length (e.g., through UE assistance information message) with the network (e.g., base station), as described in connection with FIG. 6, the UE may be able to measure multiple NR frequencies with the 21 ms search window in the CDRX OFF period and/or reduce scheduling extended OTA gap measurements. This may improve SCG addition as it does not suspend uplink/downlink activity, thereby providing an enhanced throughput experience.

Figure 7:
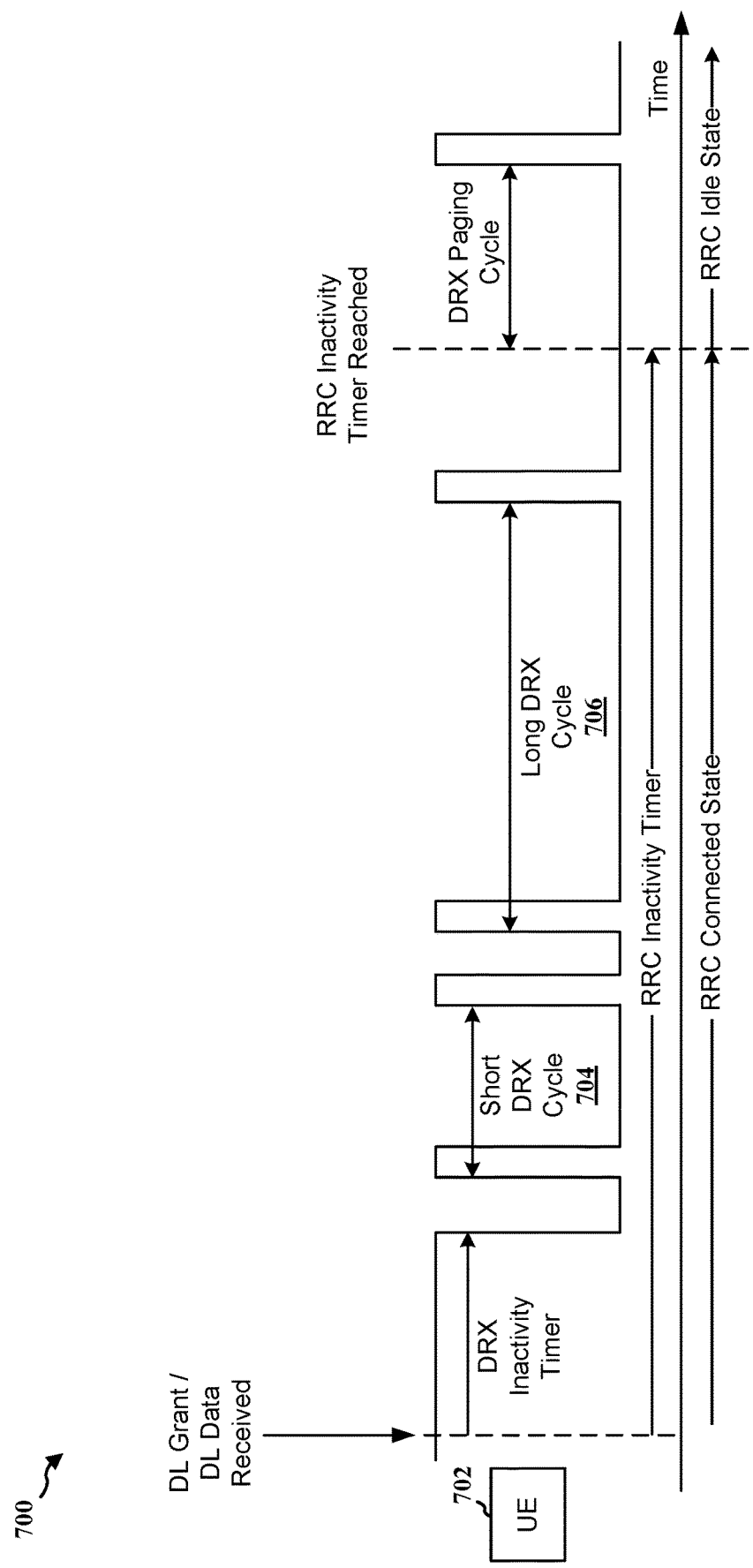
FIG. 7 is a diagram illustrating an example of a DRX operation in accordance with various aspects of the present disclosure.

In another aspect of the present disclosure, a UE may be configured with a capability to disable or disallow toggling between the long CDRX cycle and the short CDRX cycle when the UE is performing certain operations, such as when the UE is performing the CGI measurement(s) for one or more cells. For example, as shown by a diagram 700 of FIG. 7, a UE 702 may be configured with a CDRX that includes a short DRX cycle 704 and a long DRX cycle 706. While the UE 702 is performing a CGI measurement for a cell, the UE 702 may disable/disallow toggling between the short DRX cycle 704 and the long DRX cycle 706. For example, if the UE 702 is performing the CGI measurement during the short DRX cycle 704, and then a long DRX cycle is configured/updated for the UE 702 by a base station during the CGI measurement or the pre-configured long DRX cycle 706 is to be triggered (e.g., the short DRX cycle 704 expires), the UE 702 may disallow or disable toggling from the short DRX cycle 704 to a long DRX cycle (e.g., long DRX cycle 706). The UE 702 may continue to perform the CGI measurement, and the UE 702 may drop the received configuration/update for the long DRX cycle or the pre-scheduled long DRX cycle 706. Similarly, in another example, when the UE 702 is performing the CGI measurement during the long DRX cycle 706 and receives a configuration/update requesting the UE 702 to switch to a short DRX cycle, the UE 702 may continue to perform the CGI measurement under the long DRX cycle 706 and drop the received configuration/update for the short DRX cycle. By disallowing or disabling toggling of short to long and/or long to short CDRX updates/configuration during ongoing CGI measurement(s), the UE 702 may avoid its mmW beamer to be switched ON for a longer period of time, and may avoid power consumption and scheduling concern due to redundant mmW beamer switching (e.g., between ON and OFF).

In another aspect of the present disclosure, a UE may apply its own pre-defined measurement periodicity values (e.g., CDRX parameters) that are independent of the CDRX configuration received from a network. For example, based on an operation the UE is performing or scheduled to perform (e.g., CGI measurement), the UE may determine a CDRX with optimized/adjusted values for at least one of the CDRX inactivity timer, the short CDRX cycle, and the long CDRX cycle for that operation. Thus, when the UE is performing the operation, the UE may apply its CDRX with optimized values, and may ignore the CDRX configuration/update received from the network. After the UE completes the operation, the UE may return back to a default CDRX cycle, and may continue to apply CDRX configurations/updates received from the network. The UE may determine its CDRX based on pre-defined rules, and the CDRX may be configured and/or adjusted dynamically by the UE during the operation. This may enable faster UE performance and network addition (e.g., faster CGI measurement) as the UE may save time in negotiating a CDRX period with the base station and/or waiting to receive a CDRX configuration/update from the base station, etc.

Figure 8:
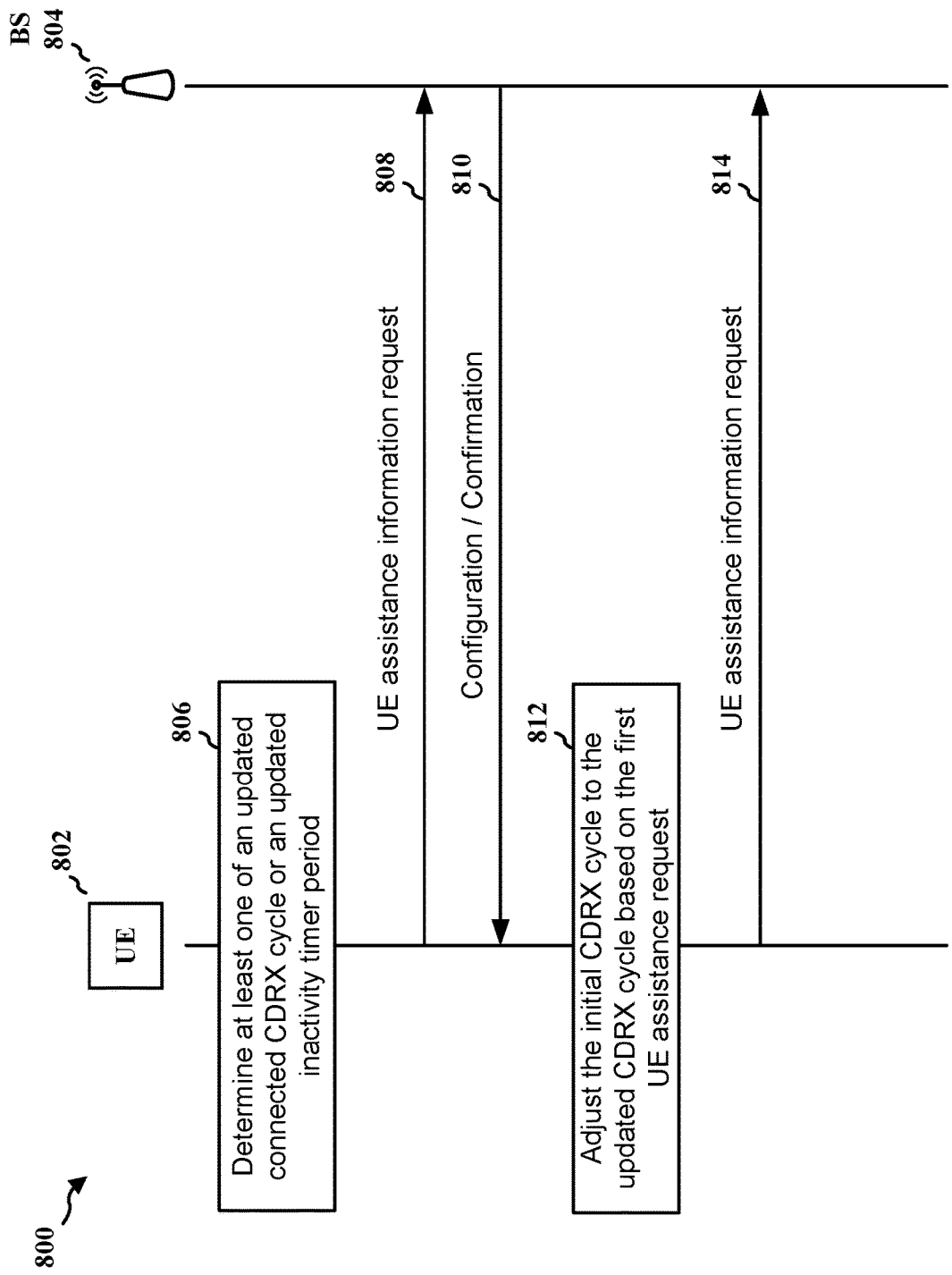
FIG. 8 is a diagram illustrating a communication flow between a UE and a base station in accordance with various aspects of the present disclosure.

FIG. 8 is a communication flow 800 between a UE 802 and a base station 804 according to aspects of the present disclosure, such as described in connection with FIG. 6. At 806, the UE 802 may determine at least one of an updated CDRX cycle or an updated inactivity timer period. The updated CDRX cycle may be different from an initial CDRX cycle, and the updated inactivity timer period may also be different from an initial inactivity timer period. The updated CDRX cycle may be based on one or more predetermined CDRX cycles. For example, the updated CDRX cycle may be longer than the initial CDRX cycle, and the updated inactivity timer period may be shorter than the initial inactivity timer period, etc. The UE 802 may determine the values for the updated CDRX cycle and/or the updated inactivity timer period based on pre-defined rules, and the pre-defined rules may be associated with at least one of a UE power consumption or a measurement schedule duration.

At 808, after the UE 802 determines at least one of an updated CDRX cycle or an updated inactivity timer period, the UE 802 may transmit, to the base station 804, a first UE assistance information request, where the first UE assistance information request may include at least one of the updated CDRX cycle or the updated inactivity timer period.

At 810, in response to the request from the UE 802, the base station 804 may transmit a CDRX configuration/update or a positive confirmation to the UE 802 to adjust the UE 802 from the initial CDRX cycle to the updated CDRX cycle based on the first UE assistance information request, such as described in connection with FIG. 6. For example, the base station 804 may transmit to the UE 802 a response based on the first UE assistance information request, where the response may be associated with at least one of the updated CDRX cycle or the updated inactivity timer period. Thus, the initial CDRX cycle of the UE 802 may be adjusted to the updated CDRX cycle by the base station 804.

At 812, after the UE 802 receives the configuration or the confirmation from the base station 804, the UE 802 may adjust its initial CDRX cycle to the updated CDRX cycle based on the first UE assistance information request, where the UE 802 may be operating under the updated CDRX cycle.

At 814, after the initial CDRX cycle is adjusted, the UE 802 may also return back to the initial CDRX by transmitting a second UE assistance information request to the base station 804, where the second UE assistance information request includes at least one of the initial CDRX cycle or the initial inactivity timer period. In response to the second UE assistance information request, the base station 804 may transmit another CDRX configuration/update or a positive confirmation to the UE 802 to adjust the UE 802 from the updated CDRX cycle back to the initial CDRX cycle based on the second UE assistance request. Then, the UE 802 may adjust the updated CDRX cycle to the initial CDRX cycle based on the second UE assistance information request.

In one example, the UE 802 may request the base station 804 for an updated CDRX cycle and/or an updated inactivity timer period when the UE 802 is measuring or is scheduled to measure at least one CGI for a cell, where the measurement may be based on a measurement configuration received from the base station 804. The UE 802 may stop the adjustment of the initial CDRX cycle when the at least one CGI is being measured. Then, the UE 802 may reinitiate the adjustment of the initial CDRX cycle after the at least one CGI is measured.

In another example, the UE 802 may initiate a CDRX procedure associated with the initial CDRX cycle and the updated CDRX cycle, where the initial CDRX cycle and the updated CDRX cycle may correspond to at least one of a long CDRX cycle or a short CDRX cycle.

In another example, the UE 802 may determine one or more additional CDRX cycles, where the one or more additional CDRX cycles may be independent of the CDRX cycles configured or updated by the base station 804. In addition, the one or more additional CDRX cycles may be configurable or adjustable by the UE, such as based on pre-defined rules.

Figure 9:
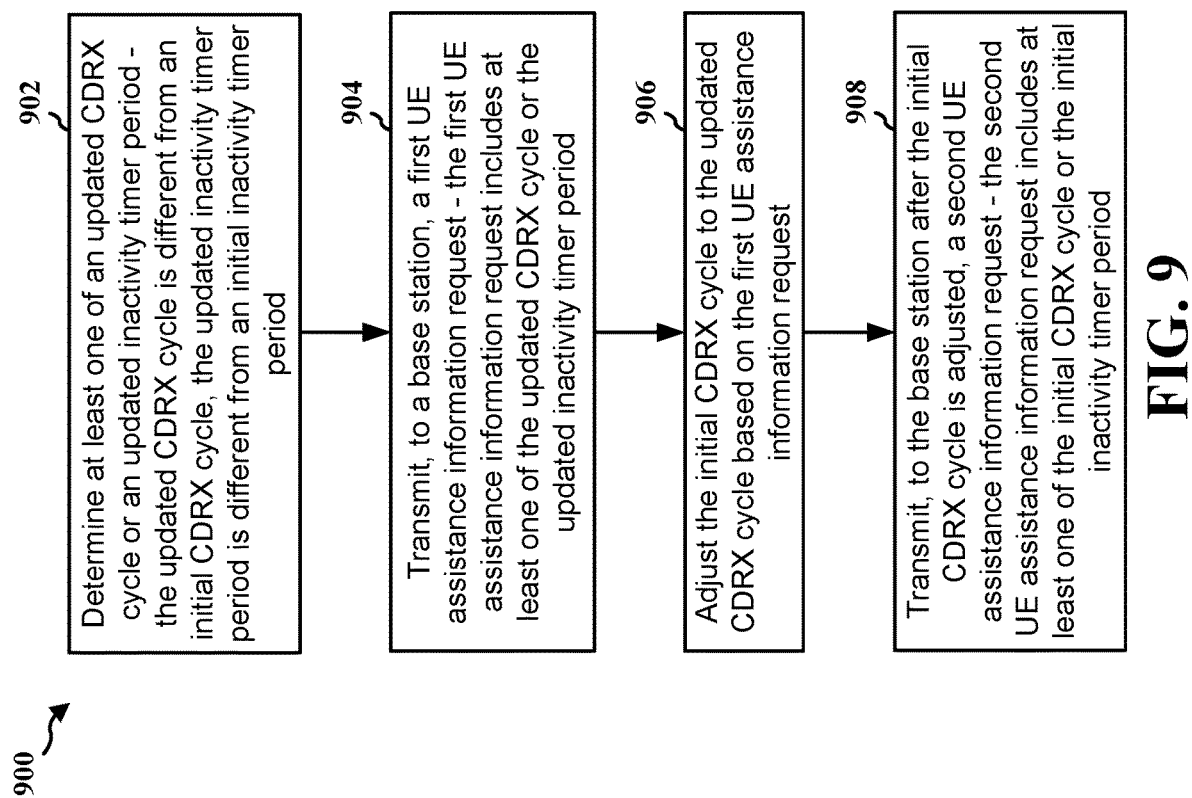
FIG. 9 is a flowchart of a method of wireless communication.

FIG. 9 is a flowchart of a method 900 of wireless communication. The method may be performed by a UE or a component of a UE (e.g., the UE 104, 350, 502, 602, 702, 802; the apparatus 1002; a processing system, which may include the memory 360 and which may be the entire UE 350 or a component of the UE 350, such as the TX processor 368, the RX processor 356, and/or the controller/processor 359). The method may enable the UE to negotiate one or more parameters associated with a CDRX cycle with a base station.

At 902, the UE may determine at least one of an updated CDRX cycle or an updated inactivity timer period, the updated CDRX cycle being different from an initial CDRX cycle, the updated inactivity timer period being different from an initial inactivity timer period, such as described in connection with FIGS. 6 and 8. For example, at 806, the UE 802 may determine at least one of an updated CDRX cycle or an updated inactivity timer period. The determination of the at least one of an updated CDRX cycle or an updated inactivity timer period may be performed, e.g., the CDRX determination component 1040 of the apparatus 1002 in FIG. 10.

In one example, the updated CDRX cycle may be based on one or more predetermined CDRX cycles. In another example, the updated CDRX cycle may be longer than the initial CDRX cycle, and the updated inactivity timer period may be shorter than the initial inactivity timer period. In another example, the updated CDRX cycle may be shorter than the initial CDRX cycle. In another example, the updated CDRX cycle may be configurable or adjustable, and the updated CDRX cycle may optionally be associated with at least one of a UE power consumption or a measurement schedule duration. In addition, the UE may also determine one or more additional CDRX cycles.

In one example, the UE may request the base station for an updated CDRX cycle and/or an updated inactivity timer period when the UE is measuring or is scheduled to measure at least one CGI for a cell, where the measurement may be based on a measurement configuration received from the base station. The UE may stop the adjustment of the initial CDRX cycle when the at least one CGI is being measured. Then, the UE may reinitiate the adjustment of the initial CDRX cycle after the at least one CGI is measured.

In another example, the UE may initiate a CDRX procedure associated with the initial CDRX cycle and the updated CDRX cycle, where the initial CDRX cycle and the updated CDRX cycle may correspond to at least one of a long CDRX cycle or a short CDRX cycle.

At 904, the UE may transmit, to a base station, a first UE assistance information request, the first UE assistance information request including at least one of the updated CDRX cycle or the updated inactivity timer period, such as described in connection with FIGS. 6 and 8. For example, at 808, the UE 802 may transmit a first UE assistance information request to the base station 804, where the first UE assistance information request may include at least one of the updated CDRX cycle or the updated inactivity timer period. In response, the UE may receive, from the base station, a response based on the first UE assistance information request, where the response may be associated with at least one of the updated CDRX cycle or the updated inactivity timer period. The transmission of the first UE assistance information request may be performed, e.g., the CDRX negotiation component 1042 and/or the transmission component 1034 of the apparatus 1002 in FIG. 10.

At 906, the UE may adjust the initial CDRX cycle to the updated CDRX cycle based on the first UE assistance information request, such as described in connection with FIGS. 6 and 8. For example, at 812, the UE 802 may adjust the initial CDRX cycle to the updated CDRX cycle based on the first UE assistance information request. In other words, the initial CDRX cycle may be adjusted to the updated CDRX cycle by the base station. The adjustment of the initial CDRX cycle may be performed, e.g., the CDRX adjustment component 1044 of the apparatus 1002 in FIG. 10.

At 908, the UE may transmit, to the base station after the initial CDRX cycle is adjusted, a second UE assistance information request, the second UE assistance information request including at least one of the initial CDRX cycle or the initial inactivity timer period, such as described in connection with FIGS. 6 and 8. For example, at 814, the UE 802 may transmit a second UE assistance information request to the base station 804, where the second UE assistance information request may include at least one of the initial CDRX cycle or the initial inactivity timer period. Similarly, after transmitting the second UE assistance information request, the UE may adjust the updated CDRX cycle to the initial CDRX cycle based on the second UE assistance information request. The transmission of the second UE assistance information request may be performed, e.g., the default CDRX resume component 1046 and/or the transmission component 1034 of the apparatus 1002 in FIG. 10.

Figure 10:
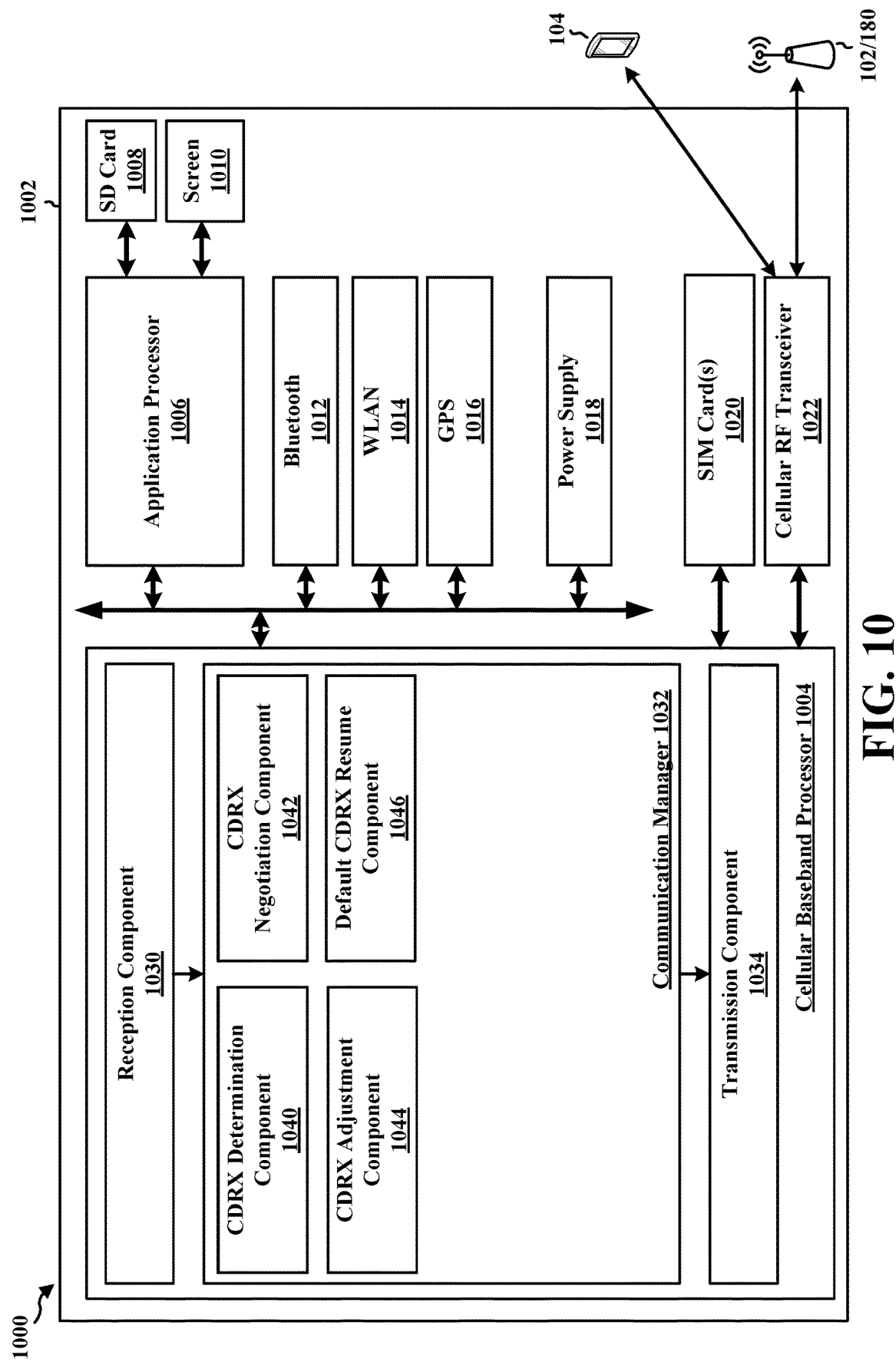
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/ memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the additional modules of the apparatus 1002.

The communication manager 1032 includes a CDRX determination component 1040 that is configured to determine at least one of an updated CDRX cycle or an updated inactivity timer period, the updated CDRX cycle being different from an initial CDRX cycle, the updated inactivity timer period being different from an initial inactivity timer period, e.g., as described in connection with 902 of FIG. 9. The communication manager 1032 further includes a CDRX negotiation component 1042 that is configured to transmit, to a base station, a first UE assistance information request, the first UE assistance information request including at least one of the updated CDRX cycle or the updated inactivity timer period, e.g., as described in connection with 904 of FIG. 9. The communication manager 1032 further includes a CDRX adjustment component 1044 that is configured to adjust the initial CDRX cycle to the updated CDRX cycle based on the first UE assistance information request, e.g., as described in connection with 906 of FIG. 9. The communication manager 1032 further includes a default CDRX resume component 1046 that is configured to transmit, to the base station after the initial CDRX cycle is adjusted, a second UE assistance information request, the second UE assistance information request including at least one of the initial CDRX cycle or the initial inactivity timer period, e.g., as described in connection with 908 of FIG. 9.

The apparatus may include additional components that perform each of the blocks of the algorithm in the flowchart of FIG. 9. As such, each block in the flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for determining at least one of an updated CDRX cycle or an updated inactivity timer period, the updated CDRX cycle being different from an initial CDRX cycle, the updated inactivity timer period being different from an initial inactivity timer period (e.g., the CDRX determination component 1040). The apparatus 1002 includes means for transmitting, to a base station, a first UE assistance information request, the first UE assistance information request including at least one of the updated CDRX cycle or the updated inactivity timer period (e.g., the CDRX negotiation component 1042 and/or the transmission component 1034). The apparatus 1002 includes means for adjusting the initial CDRX cycle to the updated CDRX cycle based on the first UE assistance information request (e.g., the CDRX adjustment component 1044). The apparatus 1002 includes means for transmitting, to the base station after the initial CDRX cycle is adjusted, a second UE assistance information request, the second UE assistance information request including at least one of the initial CDRX cycle or the initial inactivity timer period (e.g., the default CDRX resume component 1046 and/or the transmission component 1034). The apparatus 1002 includes means for adjusting the updated CDRX cycle to the initial CDRX cycle based on the second UE assistance information request. The updated CDRX cycle is based on one or more predetermined CDRX cycles. In one configuration, the updated CDRX cycle in the first UE assistance information request is longer than the initial CDRX cycle, and the updated inactivity timer period is shorter than the initial inactivity timer period. In another configuration, the updated CDRX cycle is shorter than the initial CDRX cycle. The initial CDRX cycle may be adjusted to the updated CDRX cycle by the base station. The apparatus 1002 include s means for determining one or more additional CDRX cycles. The updated CDRX cycle is configurable or adjustable. The updated CDRX cycle may be associated with at least one of a UE power consumption or a measurement schedule duration.

In one configuration, the apparatus 1002 includes means for measuring at least one CGI based on a measurement configuration from the base station. In such configuration, the apparatus 1002 includes means for stopping the adjustment of the initial CDRX cycle when the at least one CGI is being measured. In such configuration, the apparatus 1002 includes means for reinitiating the adjustment of the initial CDRX cycle after the at least one CGI is measured.

In one configuration, the apparatus 1002 includes means for receiving, from the base station, a response based on the first UE assistance information request, the response associated with at least one of the updated CDRX cycle or the updated inactivity timer period.

In one configuration, the apparatus 1002 includes means for initiating a CDRX procedure associated with the initial CDRX cycle and the updated CDRX cycle. In such configuration, the initial CDRX cycle and the updated CDRX cycle correspond to at least one of a long CDRX cycle or a short CDRX cycle.

The means may be one or more of the components of the apparatus 1002 configured to perform the functions recited by the means. As described supra, the apparatus 1002 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 11:
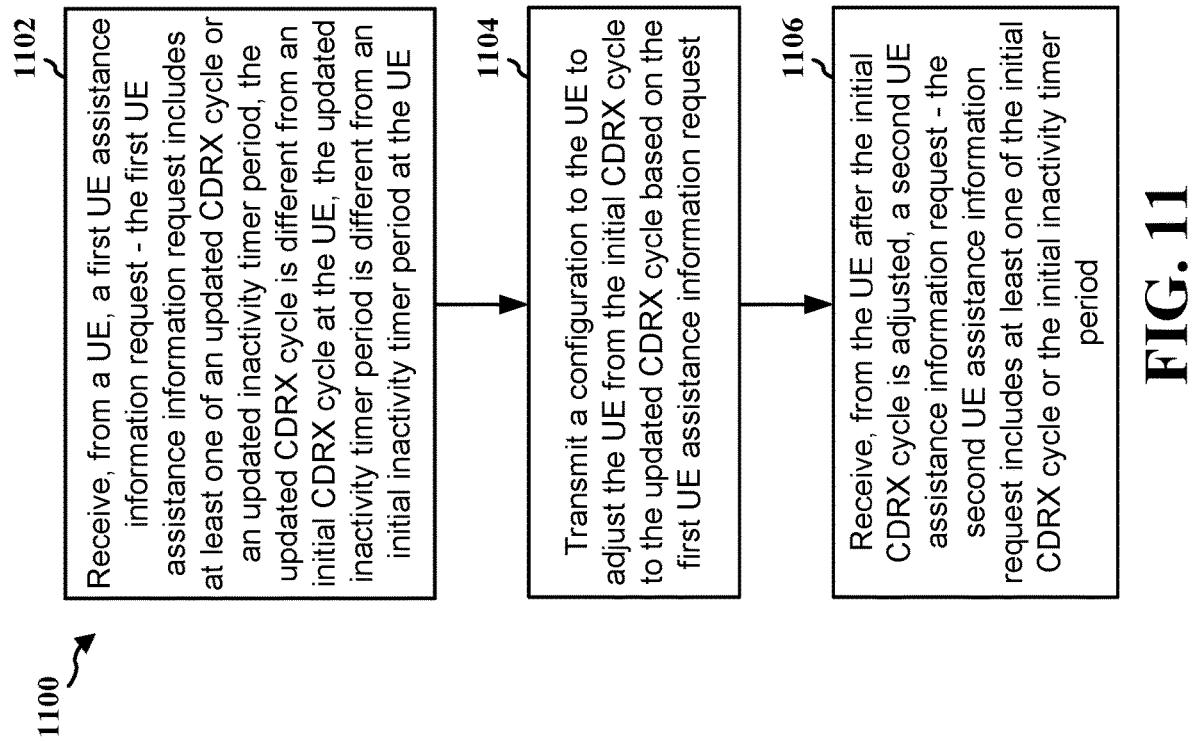
FIG. 11 is a flowchart of a method of wireless communication.

FIG. 11 is a flowchart 1100 of a method of wireless communication. The method may be performed by a base station or a component of a base station (e.g., the base station 102, 180, 310, 604, 804; the apparatus 1202; a processing system, which may include the memory 376 and which may be the entire base station 310 or a component of the base station 310, such as the TX processor 316 the RX processor 370, and/or the controller/processor 375). The method may enable the base station to adjust one or more CDRX cycles for a UE based on the UE's proposed CDRX cycles.

At 1102, the base station may receive, from a UE, a first UE assistance information request, the first UE assistance information request including at least one of an updated CDRX cycle or an updated inactivity timer period, the updated CDRX cycle being different from an initial CDRX cycle at the UE, the updated inactivity timer period being different from an initial inactivity timer period at the UE, such as described in connection with FIGS. 6 and 8. For example, at 808, the UE 802 may transmit a first UE assistance information request to the base station 804, where the first UE assistance information request may include at least one of the updated CDRX cycle or the updated inactivity timer period. The reception of the first UE assistance information request may be performed, e.g., the UE assistance request process component 1240 and/or the reception component 1230 of the apparatus 1202 in FIG. 12.

In one example, the updated CDRX cycle is based on one or more predetermined CDRX cycles at the UE. In another example, the updated CDRX cycle in the first UE assistance information request is longer than the initial CDRX cycle, and the updated inactivity timer period is shorter than the initial inactivity timer period. In another example, the updated CDRX cycle is shorter than the initial CDRX cycle. In another example, the UE may initiate a CDRX procedure associated with the initial CDRX cycle and the updated CDRX cycle, where the initial CDRX cycle and the updated CDRX cycle may correspond to at least one of a long CDRX cycle or a short CDRX cycle. The UE may also determine one or more additional CDRX cycles, and the updated CDRX cycle may be configurable or adjustable by the UE. For example, the UE may associate the updated CDRX cycle with at least one of a UE power consumption or a measurement schedule duration.

At 1104, the base station may transmit a configuration to the UE to adjust the UE from the initial CDRX cycle to the updated CDRX cycle based on the first UE assistance information request, such as described in connection with FIGS. 6 and 8. For example, at 810, in response to the request from the UE 802, the base station 804 may transmit a CDRX configuration/update or a positive confirmation to the UE 802 to adjust the UE 802 from the initial CDRX cycle to the updated CDRX cycle based on the first UE assistance information request. In other words, the base station may transmit, to the UE, a response based on the first UE assistance information request, the response may be associated with at least one of the updated CDRX cycle or the updated inactivity timer period. Thus, the base station may adjust the initial CDRX cycle at the UE to the updated CDRX cycle. The transmission of the configuration may be performed, e.g., the CDRX configuration component 1242 and/or the transmission component 1234 of the apparatus 1202 in FIG. 12.

In one example, the base station may also transmit a measurement configuration to the UE for the UE to perform at least one CGI measurements. In response to the measurement configuration, the UE may stop the adjustment of the initial CDRX cycle when the at least one CGI is being measured by the UE. In addition, the UE may reinitiate the adjustment of the initial CDRX cycle after the at least one CGI is measured by the UE.

At 1106, the base station may receive, from the UE after the initial CDRX cycle is adjusted, a second UE assistance information request, the second UE assistance information request including at least one of the initial CDRX cycle or the initial inactivity timer period, such as described in connection with FIGS. 6 and 8. For example, at 814, the UE 802 may transmit a second UE assistance information request to the base station 804, where the second UE assistance information request may include at least one of the initial CDRX cycle or the initial inactivity timer period. In response, the base station may transmit another configuration to the UE to adjust the updated CDRX cycle to the initial CDRX cycle for the UE based on the second UE assistance information request. The reception of the second UE assistance information request may be performed, e.g., the default UE CDRX configuration component 1244, the UE assistance request process component 1240, and/or the reception component 1230 of the apparatus 1202 in FIG. 12.

Figure 12:
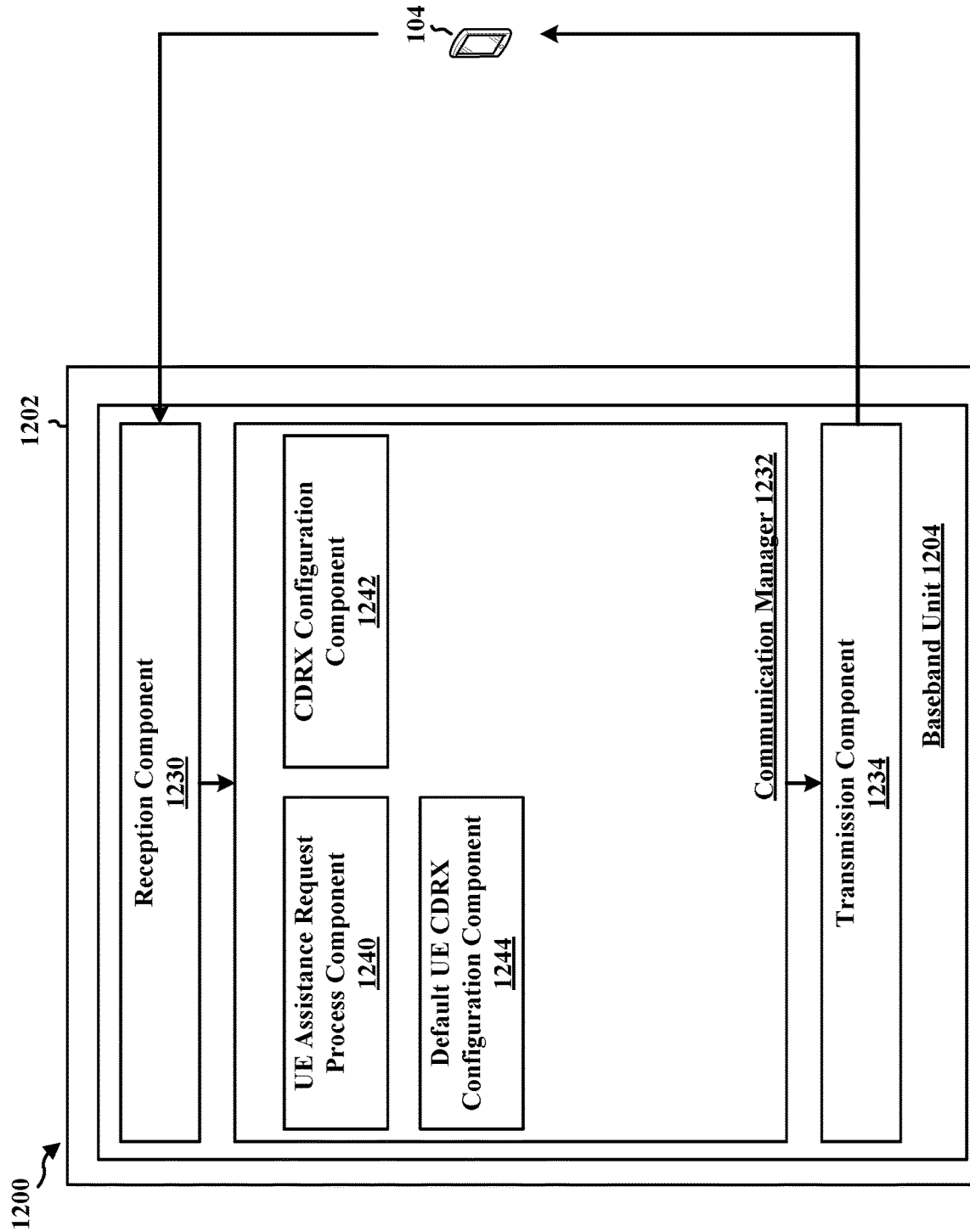
FIG. 12 is a diagram illustrating an example of a hardware implementation for an example apparatus.

FIG. 12 is a diagram 1200 illustrating an example of a hardware implementation for an apparatus 1202. The apparatus 1202 is a BS and includes a baseband unit 1204. The baseband unit 1204 may communicate through a cellular RF transceiver with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the BS 310 and may include the memory 376 and/or at least one of the TX processor 316, the RX processor 370, and the controller/processor 375.

The communication manager 1232 includes a UE assistance request process component 1240 that is configured to receive, from a UE, a first UE assistance information request, the first UE assistance information request including at least one of an updated CDRX cycle or an updated inactivity timer period, the updated CDRX cycle being different from an initial CDRX cycle at the UE, the updated inactivity timer period being different from an initial inactivity timer period at the UE, e.g., as described in connection with 1102 of FIG. 11. The communication manager 1232 further includes a CDRX configuration component 1242 that is configured to transmit a configuration to the UE to adjust the UE from the initial CDRX cycle to the updated CDRX cycle based on the first UE assistance information request, e.g., as described in connection with 1104 of FIG. 11. The communication manager 1232 includes a default UE CDRX configuration component 1244 that is configured to receive, from the UE after the initial CDRX cycle is adjusted, a second UE assistance information request, the second UE assistance information request including at least one of the initial CDRX cycle or the initial inactivity timer period, e.g., as described in connection with 1106 of FIG. 11.

The apparatus may include additional components that perform each of the blocks of the algorithm in the flowchart of FIG. 11. As such, each block in the flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes means for receiving, from a UE, a first UE assistance information request, the first UE assistance information request including at least one of an updated CDRX cycle or an updated inactivity timer period, the updated CDRX cycle being different from an initial CDRX cycle at the UE, the updated inactivity timer period being different from an initial inactivity timer period at the UE (e.g., the UE assistance request process component 1240 and/or the reception component 1230). The apparatus 1202 includes means for transmitting a configuration to the UE to adjust the UE from the initial CDRX cycle to the updated CDRX cycle based on the first UE assistance information request (e.g., the CDRX configuration component 1242 and/or the transmission component 1234). The apparatus 1202 includes means for adjusting the initial CDRX cycle at the UE to the updated CDRX cycle. The apparatus 1202 includes means for receiving, from the UE after the initial CDRX cycle is adjusted, a second UE assistance information request, the second UE assistance information request including at least one of the initial CDRX cycle or the initial inactivity timer period (e.g., the default UE CDRX configuration component 1244, the UE assistance request process component 1240, and/or the reception component 1230). The UE may adjust the updated CDRX cycle to the initial CDRX cycle based on the second UE assistance information request. The updated CDRX cycle may be based on one or more predetermined CDRX cycles. In one configuration, the updated CDRX cycle in the first UE assistance information request is longer than the initial CDRX cycle, and the updated inactivity timer period is shorter than the initial inactivity timer period. In another configuration, the updated CDRX cycle is shorter than the initial CDRX cycle. The UE may initiate a CDRX procedure associated with the initial CDRX cycle and the updated CDRX cycle, where the initial CDRX cycle and the updated CDRX cycle may correspond to at least one of a long CDRX cycle or a short CDRX cycle. The UE may determine one or more additional CDRX cycles. The updated CDRX cycle may be configurable or adjustable by the UE. The updated CDRX cycle may be associated with at least one of a UE power consumption or a measurement schedule duration.

In one configuration, the apparatus 1202 includes means for transmitting a measurement configuration to the UE for measuring at least one CGI. In such configuration, the UE stops the adjustment of the initial CDRX cycle when the at least one CGI is being measured by the UE. In such configuration, the UE reinitiates the adjustment of the initial CDRX cycle after the at least one CGI is measured by the UE.

In one configuration, the apparatus 1202 includes means for transmitting, to the UE, a response based on the first UE assistance information request, the response associated with at least one of the updated CDRX cycle or the updated inactivity timer period.

The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 13:
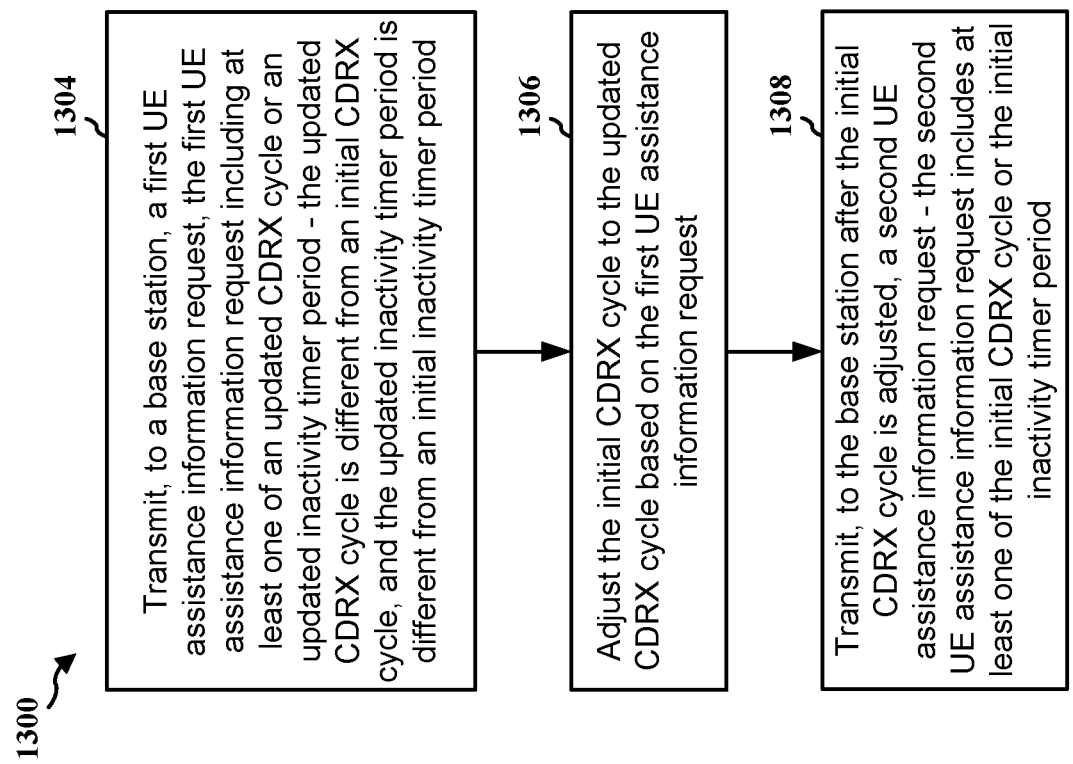
FIG. 13 is a flowchart of a method of wireless communication.

FIG. 13 is a flowchart of a method 1300 of wireless communication. The method may be performed by a UE or a component of a UE (e.g., the UE 104, 350, 502, 602, 702, 802; the apparatus 1402; a processing system, which may include the memory 360 and which may be the entire UE 350 or a component of the UE 350, such as the TX processor 368, the RX processor 356, and/or the controller/processor 359). The method may enable the UE to negotiate one or more parameters associated with a CDRX cycle with a base station.

At 1304, the UE may transmit, to a base station, a first UE assistance information request, the first UE assistance information request may include at least one of an updated CDRX cycle or an updated inactivity timer period, the updated CDRX cycle may be different from an initial CDRX cycle, and the updated inactivity timer period may be different from an initial inactivity timer period, such as described in connection with FIGS. 6 and 8. For example, at 808, the UE 802 may transmit a first UE assistance information request to the base station 804, where the first UE assistance information request may include at least one of the updated CDRX cycle or the updated inactivity timer period. In response, the UE may receive, from the base station, a response based on the first UE assistance information request, where the response may be associated with at least one of the updated CDRX cycle or the updated inactivity timer period. The transmission of the first UE assistance information request may be performed, e.g., the CDRX negotiation component 1442 and/or the transmission component 1434 of the apparatus 1402 in FIG. 14.

In one example, the updated CDRX cycle may be based on one or more predetermined CDRX cycles. In another example, the updated CDRX cycle may be longer than the initial CDRX cycle, and the updated inactivity timer period may be shorter than the initial inactivity timer period. In another example, the updated CDRX cycle may be shorter than the initial CDRX cycle. In another example, the updated CDRX cycle may be configurable or adjustable, and the updated CDRX cycle may optionally be associated with at least one of a UE power consumption or a measurement schedule duration. In addition, the UE may also determine one or more additional CDRX cycles.

In another example, the UE may request the base station for an updated CDRX cycle and/or an updated inactivity timer period when the UE is measuring or is scheduled to measure at least one CGI for a cell, where the measurement may be based on a measurement configuration received from the base station. The UE may stop the adjustment of the initial CDRX cycle when the at least one CGI is being measured. Then, the UE may reinitiate the adjustment of the initial CDRX cycle after the at least one CGI is measured.

In another example, the UE may initiate a CDRX procedure associated with the initial CDRX cycle and the updated CDRX cycle, where the initial CDRX cycle and the updated CDRX cycle may correspond to at least one of a long CDRX cycle or a short CDRX cycle.

At 1306, the UE may adjust the initial CDRX cycle to the updated CDRX cycle based on the first UE assistance information request, such as described in connection with FIGS. 6 and 8. For example, at 812, the UE 802 may adjust the initial CDRX cycle to the updated CDRX cycle based on the first UE assistance information request. In other words, the initial CDRX cycle may be adjusted to the updated CDRX cycle by the base station. The adjustment of the initial CDRX cycle may be performed, e.g., the CDRX adjustment component 1444 of the apparatus 1402 in FIG. 14.

At 1308, the UE may transmit, to the base station after the initial CDRX cycle is adjusted, a second UE assistance information request, the second UE assistance information request including at least one of the initial CDRX cycle or the initial inactivity timer period, such as described in connection with FIGS. 6 and 8. For example, at 814, the UE 802 may transmit a second UE assistance information request to the base station 804, where the second UE assistance information request may include at least one of the initial CDRX cycle or the initial inactivity timer period. Similarly, after transmitting the second UE assistance information request, the UE may adjust the updated CDRX cycle to the initial CDRX cycle based on the second UE assistance information request. The transmission of the second UE assistance information request may be performed, e.g., the default CDRX resume component 1446 and/or the transmission component 1434 of the apparatus 1402 in FIG. 14.

Figure 14:
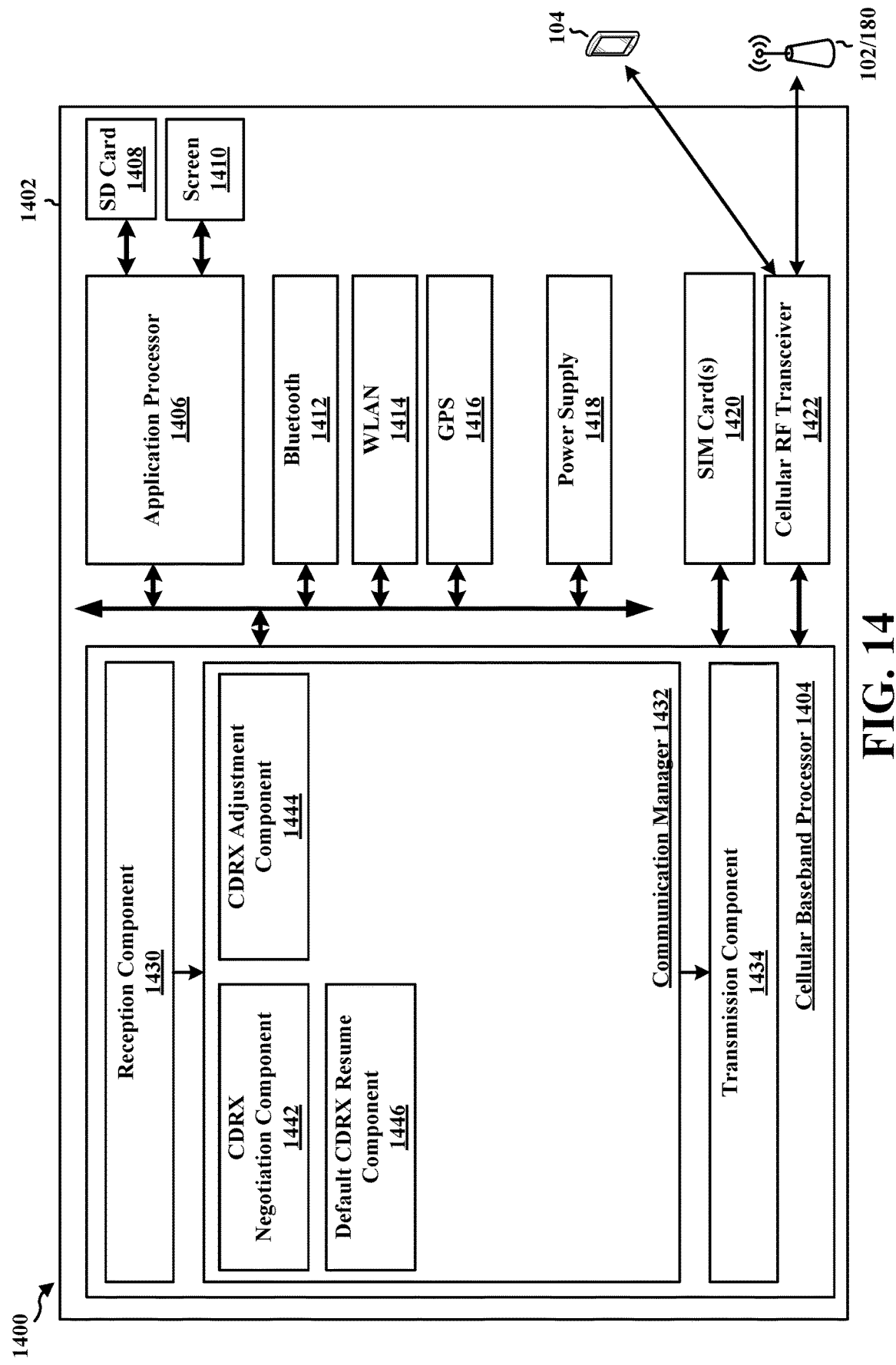
FIG. 14 is a diagram illustrating an example of a hardware implementation for an example apparatus.

FIG. 14 is a diagram 1400 illustrating an example of a hardware implementation for an apparatus 1402. The apparatus 1402 is a UE and includes a cellular baseband processor 1404 (also referred to as a modem) coupled to a cellular RF transceiver 1422 and one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and a power supply 1418. The cellular baseband processor 1404 communicates through the cellular RF transceiver 1422 with the UE 104 and/or BS 102/180. The cellular baseband processor 1404 may include a computer-readable medium/memory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 includes a CDRX negotiation component 1442 that is configured to transmit, to a base station, a first UE assistance information request, the first UE assistance information request including at least one of an updated CDRX cycle or an updated inactivity timer period, the updated CDRX cycle being different from an initial CDRX cycle, the updated inactivity timer period being different from an initial inactivity timer period, e.g., as described in connection with 1304 of FIG. 13. The communication manager 1432 further includes a CDRX adjustment component 1444 that is configured to adjust the initial CDRX cycle to the updated CDRX cycle based on the first UE assistance information request, e.g., as described in connection with 1306 of FIG. 13. The communication manager 1432 further includes a default CDRX resume component 1446 that is configured to transmit, to the base station after the initial CDRX cycle is adjusted, a second UE assistance information request, the second UE assistance information request including at least one of the initial CDRX cycle or the initial inactivity timer period, e.g., as described in connection with 1308 of FIG. 13.

The apparatus may include additional components that perform each of the blocks of the algorithm in the flowchart of FIG. 13. As such, each block in the flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the cellular baseband processor 1004, includes means for transmitting, to a base station, a first UE assistance information request, the first UE assistance information request including at least one of an updated CDRX cycle or an updated inactivity timer period, the updated CDRX cycle being different from an initial CDRX cycle, the updated inactivity timer period being different from an initial inactivity timer period (e.g., the CDRX negotiation component 1042 and/or the transmission component 1034). The apparatus 1402 includes means for adjusting the initial CDRX cycle to the updated CDRX cycle based on the first UE assistance information request (e.g., the CDRX adjustment component 1044). The apparatus 1402 includes means for transmitting, to the base station after the initial CDRX cycle is adjusted, a second UE assistance information request, the second UE assistance information request including at least one of the initial CDRX cycle or the initial inactivity timer period (e.g., the default CDRX resume component 1046 and/or the transmission component 1034). The apparatus 1402 includes means for adjusting the updated CDRX cycle to the initial CDRX cycle based on the second UE assistance information request. The updated CDRX cycle is based on one or more predetermined CDRX cycles. In one configuration, the updated CDRX cycle in the first UE assistance information request is longer than the initial CDRX cycle, and the updated inactivity timer period is shorter than the initial inactivity timer period. In another configuration, the updated CDRX cycle is shorter than the initial CDRX cycle. The initial CDRX cycle may be adjusted to the updated CDRX cycle by the base station. The apparatus 1402 includes means for determining one or more additional CDRX cycles. The updated CDRX cycle is configurable or adjustable. The updated CDRX cycle may be associated with at least one of a UE power consumption or a measurement schedule duration.

In one configuration, the apparatus 1402 includes means for measuring at least one CGI based on a measurement configuration from the base station. In such configuration, the apparatus 1402 includes means for stopping the adjustment of the initial CDRX cycle when the at least one CGI is being measured. In such configuration, the apparatus 1402 includes means for reinitiating the adjustment of the initial CDRX cycle after the at least one CGI is measured.

In one configuration, the apparatus 1402 includes means for receiving, from the base station, a response based on the first UE assistance information request, the response associated with at least one of the updated CDRX cycle or the updated inactivity timer period.

In one configuration, the apparatus 1402 includes means for initiating a CDRX procedure associated with the initial CDRX cycle and the updated CDRX cycle. In such configuration, the initial CDRX cycle and the updated CDRX cycle correspond to at least one of a long CDRX cycle or a short CDRX cycle.

The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to transmit, to a base station, a first UE assistance information request, the first UE assistance information request including at least one of an updated CDRX cycle or an updated inactivity timer period, the updated CDRX cycle being different from an initial CDRX cycle, the updated inactivity timer period being different from an initial inactivity timer period; adjust the initial CDRX cycle to the updated CDRX cycle based on the first UE assistance information request; and transmit, to the base station after the initial CDRX cycle is adjusted, a second UE assistance information request, the second UE assistance information request including at least one of the initial CDRX cycle or the initial inactivity timer period.

Aspect 2 is the apparatus of aspect 1, where the at least one processor and the memory are further configured to: measure at least one CGI based on a measurement configuration from the base station.

Aspect 3 is the apparatus of any of aspects 1 and 2, where the at least one processor and the memory are further configured to: stop the adjustment of the initial CDRX cycle if the at least one CGI is being measured.

Aspect 4 is the apparatus of any of aspects 1 to 3, where the at least one processor and the memory are further configured to: reinitiate the adjustment of the initial CDRX cycle after the at least one CGI is measured.

Aspect 5 is the apparatus of any of aspects 1 to 4, where the updated CDRX cycle is based on one or more predetermined CDRX cycles.

Aspect 6 is the apparatus of any of aspects 1 to 5, where the at least one processor and the memory are further configured to: receive, from the base station, a response based on the first UE assistance information request, the response associated with at least one of the updated CDRX cycle or the updated inactivity timer period.

Aspect 7 is the apparatus of any of aspects 1 to 6, where the updated CDRX cycle in the first UE assistance information request is longer than the initial CDRX cycle, and the updated inactivity timer period is shorter than the initial inactivity timer period.

Aspect 8 is the apparatus of any of aspects 1 to 7, where the updated CDRX cycle is shorter than the initial CDRX cycle.

Aspect 9 is the apparatus of any of aspects 1 to 8, where the at least one processor and the memory are further configured to: adjust the updated CDRX cycle to the initial CDRX cycle based on the second UE assistance information request.

Aspect 10 is the apparatus of any of aspects 1 to 9, where the at least one processor and the memory are further configured to: initiate a CDRX procedure associated with the initial CDRX cycle and the updated CDRX cycle.

Aspect 11 is the apparatus of any of aspects 1 to 10, where the initial CDRX cycle and the updated CDRX cycle correspond to at least one of a long CDRX cycle or a short CDRX cycle.

Aspect 12 is the apparatus of any of aspects 1 to 11, where the initial CDRX cycle is adjusted to the updated CDRX cycle by the base station.

Aspect 13 is the apparatus of any of aspects 1 to 12, where the at least one processor and the memory are further configured to: determine one or more additional CDRX cycles.

Aspect 14 is the apparatus of any of aspects 1 to 13, where the updated CDRX cycle is configurable or adjustable.

Aspect 15 is the apparatus of any of aspects 1 to 14, where the updated CDRX cycle is associated with at least one of a UE power consumption, a measurement schedule duration, or a scheduling.

Aspect 16 is the apparatus of any of aspects 1 to 15, further including a transceiver coupled to the at least one processor.

Aspect 17 is a method of wireless communication for implementing any of aspects 1 to 16.

Aspect 18 is an apparatus for wireless communication including means for implementing any of aspects 1 to 16.

Aspect 19 is a computer-readable medium storing computer executable code, where the code when executed by a processor causes the processor to implement any of aspects 1 to 16.

Aspect 20 is an apparatus for wireless communication including at least one processor coupled to a memory and configured to receive, from a UE, a first UE assistance information request, the first UE assistance information request including at least one of an updated CDRX cycle or an updated inactivity timer period, the updated CDRX cycle being different from an initial CDRX cycle at the UE, the updated inactivity timer period being different from an initial inactivity timer period at the UE; transmit a configuration to the UE to adjust the UE from the initial CDRX cycle to the updated CDRX cycle based on the first UE assistance information request; and receive, from the UE after the initial CDRX cycle is adjusted, a second UE assistance information request, the second UE assistance information request including at least one of the initial CDRX cycle or the initial inactivity timer period.

Aspect 21 is the apparatus of aspect 20, where the at least one processor and the memory are further configured to: transmit a measurement configuration to the UE for measuring at least one cell global identity.

Aspect 22 is the apparatus of any of aspects 20 and 21, where the updated CDRX cycle is based on one or more predetermined CDRX cycles.

Aspect 23 is the apparatus of any of aspects 20 to 22, where the at least one processor and the memory are further configured to: transmit, to the UE, a response based on the first UE assistance information request, the response associated with at least one of the updated CDRX cycle or the updated inactivity timer period.

Aspect 24 is the apparatus of any of aspects 20 to 23, where the updated CDRX cycle in the first UE assistance information request is longer than the initial CDRX cycle, and the updated inactivity timer period is shorter than the initial inactivity timer period.

Aspect 25 is the apparatus of any of aspects 20 to 24, where the updated CDRX cycle is shorter than the initial CDRX cycle.

Aspect 26 is the apparatus of any of aspects 20 to 25, where the UE adjusts the updated CDRX cycle to the initial CDRX cycle based on the second UE assistance information request.

Aspect 27 is the apparatus of any of aspects 20 to 26, where the initial CDRX cycle and the updated CDRX cycle correspond to at least one of a long CDRX cycle or a short CDRX cycle.

Aspect 28 is the apparatus of any of aspects 20 to 27, where the at least one processor and the memory are further configured to: adjust the initial CDRX cycle at the UE to the updated CDRX cycle.

Aspect 29 is the apparatus of any of aspects 20 to 28, where the updated CDRX cycle is configurable or adjustable.

Aspect 30 is the apparatus of any of aspects 20 to 29, where the updated CDRX cycle is associated with at least one of a UE power consumption, a measurement schedule duration, or a scheduling.

Aspect 31 is the apparatus of any of aspects 20 to 30, further including a transceiver coupled to the at least one processor.

Aspect 32 is a method of wireless communication for implementing any of aspects 20 to 31.

Aspect 33 is an apparatus for wireless communication including means for implementing any of aspects 20 to 31.

Aspect 34 is a computer-readable medium storing computer executable code, where the code when executed by a processor causes the processor to implement any of aspects 20 to 31.

What is claimed is:

1. An apparatus for wireless communication at a user equipment (UE), comprising:
   a memory; and
   at least one processor coupled to the memory and configured to:
      transmit, to a base station, a first UE assistance information request, the first UE assistance information request including at least one of an updated connected mode discontinuous reception (CDRX) cycle or an updated inactivity timer period, the updated CDRX cycle being different from an initial CDRX cycle, the updated inactivity timer period being different from an initial inactivity timer period;
      adjust the initial CDRX cycle to the updated CDRX cycle based on the first UE assistance information request;
      transmit, to the base station after the initial CDRX cycle is adjusted, a second UE assistance information request, the second UE assistance information request including at least one of the initial CDRX cycle or the initial inactivity timer period;
      measure at least one cell global identity (CGI) based on a measurement configuration from the base station; and
      stop the adjustment of the initial CDRX cycle if the at least one CGI is being measured.

2. The apparatus of claim 1, wherein the at least one processor and the memory are further configured to:
   reinitiate the adjustment of the initial CDRX cycle after the at least one CGI is measured.

3. The apparatus of claim 1, wherein the updated CDRX cycle is based on one or more predetermined CDRX cycles.

4. The apparatus of claim 1, wherein the at least one processor and the memory are further configured to:
   receive, from the base station, a response based on the first UE assistance information request, the response associated with at least one of the updated CDRX cycle or the updated inactivity timer period.

5. The apparatus of claim 1, wherein the updated CDRX cycle in the first UE assistance information request is longer than the initial CDRX cycle, and the updated inactivity timer period is shorter than the initial inactivity timer period.

6. The apparatus of claim 1, wherein the updated CDRX cycle is shorter than the initial CDRX cycle.

7. The apparatus of claim 1, wherein the at least one processor and the memory are further configured to:
   adjust the updated CDRX cycle to the initial CDRX cycle based on the second UE assistance information request.

8. The apparatus of claim 1, wherein the at least one processor and the memory are further configured to:
   initiate a CDRX procedure associated with the initial CDRX cycle and the updated CDRX cycle.

9. The apparatus of claim 8, wherein the initial CDRX cycle and the updated CDRX cycle correspond to at least one of a long CDRX cycle or a short CDRX cycle.

10. The apparatus of claim 1, wherein the initial CDRX cycle is adjusted to the updated CDRX cycle by the base station.

11. The apparatus of claim 1, wherein the at least one processor and the memory are further configured to:
    determine one or more additional CDRX cycles.

12. The apparatus of claim 1, wherein the updated CDRX cycle is configurable or adjustable.

13. The apparatus of claim 1, wherein the updated CDRX cycle is associated with at least one of a UE power consumption, a measurement schedule duration, or a scheduling.

14. The apparatus of claim 1, further comprising a transceiver coupled to the at least one processor.

15. A method of wireless communication at a user equipment (UE), comprising:
    transmitting, to a base station, a first UE assistance information request, the first UE assistance information request including at least one of an updated connected mode discontinuous reception (CDRX) cycle or an updated inactivity timer period, the updated CDRX cycle being different from an initial CDRX cycle, the updated inactivity timer period being different from an initial inactivity timer period;
    adjusting the initial CDRX cycle to the updated CDRX cycle based on the first UE assistance information request;
    transmitting, to the base station after the initial CDRX cycle is adjusted, a second UE assistance information request, the second UE assistance information request including at least one of the initial CDRX cycle or the initial inactivity timer period;
    measuring at least one cell global identity (CGI) based on a measurement configuration from the base station; and
    stopping the adjustment of the initial CDRX cycle if the at least one CGI is being measured.

* * * * *